United States Patent
Mutha

(10) Patent No.: US 9,424,577 B2
(45) Date of Patent: *Aug. 23, 2016

(54) SYSTEMS AND METHODS FOR PROCESSING PAYMENT TRANSACTIONS AT FUEL DISPENSING STATIONS

(71) Applicant: Aurus Inc., Norwood, MA (US)

(72) Inventor: Rahul Mutha, Norwood, MA (US)

(73) Assignee: AURUS INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,543

(22) Filed: Aug. 10, 2015

(65) Prior Publication Data

US 2016/0048835 A1    Feb. 18, 2016

Related U.S. Application Data

(63) Continuation of application No. 14/462,164, filed on Aug. 18, 2014, now Pat. No. 9,135,615.

(51) Int. Cl.
| | |
|---|---|
| *G06K 5/00* | (2006.01) |
| *G06Q 20/40* | (2012.01) |
| *G06Q 20/32* | (2012.01) |
| *G06Q 20/14* | (2012.01) |
| *G06Q 20/12* | (2012.01) |

(52) U.S. Cl.
CPC .......... *G06Q 20/401* (2013.01); *G06Q 20/12* (2013.01); *G06Q 20/145* (2013.01); *G06Q 20/32* (2013.01); *G06Q 20/322* (2013.01); *G06Q 20/325* (2013.01); *G06Q 20/40* (2013.01)

(58) Field of Classification Search
CPC . G06Q 20/325; G06Q 20/3278; G06Q 50/06
USPC ..................................... 235/379, 380, 492
See application file for complete search history.

(56) References Cited

U.S. PATENT DOCUMENTS

| | | |
|---|---|---|
| 6,193,154 B1 | 2/2001 | Phillips et al. |
| 7,110,744 B2 | 9/2006 | Freeny, Jr. |
| 7,376,583 B1 | 5/2008 | Rolf |
| 7,702,538 B2 | 4/2010 | Rau et al. |
| 7,938,321 B2 | 5/2011 | Harrell |
| 7,948,376 B2 | 5/2011 | DeLine |
| 8,554,688 B2 | 10/2013 | Harrell et al. |
| 2005/0017068 A1 | 1/2005 | Zalewski et al. |
| 2008/0313028 A1 | 12/2008 | Williams et al. |
| 2008/0313078 A1 | 12/2008 | Payne et al. |
| 2009/0084840 A1 | 4/2009 | Williams et al. |
| 2012/0130790 A1 | 5/2012 | Lyons et al. |

(Continued)

*Primary Examiner* — Seung Lee
(74) *Attorney, Agent, or Firm* — Foley & Lardner LLP; Ruben J. Rodrigues

(57) ABSTRACT

The methods and systems described herein provide for processing electronic payments at a retail location. Secure payment information for use in processing future payment transactions initiated by a mobile device may be stored at a secure location remote from retail locations. A mobile device of a user may be detected and location determined based at least in part on the strength of a signal via a wireless antennas at the retail location. A determination is made that the mobile device is associated with a user who previously provided payment information for use in processing payment transactions. The mobile device may receive incentives based at least in part on the determined location. A user may complete a payment transaction at the retail location without providing the secure payment information at the retail location.

20 Claims, 24 Drawing Sheets

(56) References Cited

U.S. PATENT DOCUMENTS

| | | |
|---|---|---|
| 2012/0221467 A1 | 8/2012 | Hamzeh et al. |
| 2013/0006776 A1 | 1/2013 | Miller et al. |
| 2013/0191198 A1 | 7/2013 | Carlson et al. |
| 2013/0212017 A1 | 8/2013 | Bangia |
| 2013/0232019 A1 | 9/2013 | Frieden et al. |
| 2013/0246171 A1 | 9/2013 | Carapelli |
| 2015/0105920 A1 | 4/2015 | Carapelli et al. |
| 2015/0120474 A1 | 4/2015 | Webb et al. |

SYSTEMS AND METHODS FOR PROCESSING PAYMENT TRANSACTIONS AT FUEL DISPENSING STATIONS

CROSS REFERENCE TO RELATED APPLICATIONS

This application continuation of U.S. application Ser. No. 14/462,164 filed Aug. 18, 2014, reference of which is hereby incorporated in its entirety.

BACKGROUND

A transaction at a fuel dispensing station typically requires many steps and sensitive information can be left vulnerable to detection or theft. A customer must interact with a fueling pump and provide sensitive information, such as credit card information, in order to begin and complete the process. The process can be inconvenient and leave the customer's sensitive information vulnerable to detection dependent upon the security infrastructure of the individual fuel dispensing station. Additionally, a merchant may post advertisements and promotions around the fuel dispensing station unsure of which customers will be exposed to them. The advertisements and promotions are targeted towards a general population as opposed to a specific customer.

SUMMARY

The present disclosure is directed towards a virtual (mobile) wallet application for a mobile device to enable the processing of payment transactions. In particular, the system is directed to systems and methods for processing of payment transactions at fuel dispensing stations. The system and methods described herein can allow an end user of a mobile device to locate a nearest fuel dispensing station, authorize transactions, activate fueling stations, and complete payment transactions through the mobile application and without physically providing sensitive payment information, such as a credit card, at the retail location. A user may register and create an account with an online payment processing system via a mobile application. The account may include credit card information and debit card information for use in a future transaction and can be stored on a remote server remotely located from any retail location. When the user wants to buy goods from a store and/or fill-up at a fuel dispensing station, they can log-in to the mobile application to complete all aspects of the transaction. The payment system described herein can identify the location of the mobile device, provide product and fueling options to the mobile device based on the location, activate the fueling location, and deduct the appropriate amount from the pre-registered user account, stored remotely from the retail location. Through these systems and methods, a user can protect sensitive payment information and complete payment transactions without carrying cash and/or credit cards.

It should be understood that any reference to fuel dispensing stations in the present disclosure refers to any and all forms of fuel dispensing stations, including pumping stations and or pump-less stations that dispense any form of fuel, including but not limited to, gasoline, diesel, petroleum, petrol, benzene, biodiesel, kerosene, ethanol, and or blends thereof.

Further, the systems and methods described herein provide a merchant of retail location valuable information to provide different types of loyalty and reward programs specific to a customer. The incentives, promotions, and advertisements can be provided to and displayed on a mobile device of a customer and be targeted to that customer's interests.

In accordance with one embodiment of the present disclosure, a back office server at a retail location may be in communication with a central server and a plurality of point of sale locations to effectuate the processing of payment transactions. The central server may be remotely located from the retail location and facilitate the use of customer loyalty programs, analytics, receipt storage, tracking, and access. The central server may be responsible for communicating with the back office server to authorize, process, and complete payment transactions. The back office server may communicate with a point of sale server to retrieve transaction costs and loyalty program information. The point of sale server may activate a point of sale location in response to receiving authorization from the central server via the back office server.

The back office may detect the presence of one or a plurality of mobility devices within a range of the retail location. A mobile application executing on the mobile device may receive a request to process a payment transaction at a point of sale location. The back office server may facilitate the processing of the payment transaction via the mobile device. The back office may generate and display promotions and advertisements on the mobile device and the point of sale location during the transaction.

In accordance with a further embodiment of the present disclosure, a method for processing payments is provided, the method comprising receiving secure payment information for use in processing future payment transactions initiated by a mobile device; storing secure payment information for the user at a secure location remote from retail locations; determining location information associated with a mobile device based at least in part on the strength of the signal detected by three or more wireless antennas at a retail location; determining that the mobile device is associated with a user who previously provided payment information for use in processing payment transactions; providing, to the mobile device of the user, an incentive based at least in part on the determined location information; receiving, from the mobile device, a request to process a payment transaction at a fuel dispensing location; sending at least a portion of the previously stored secure payment information to a remotely located server for authorization; sending to the fuel dispensing location an authorization for the requested payment transaction that does not include secure payment information; and activating a fuel dispensing station at the fuel dispensing location for use by the user.

In some embodiments, the method further includes identifying an identifier, such as a MAC address, for at least one mobile device within a range of the retail location. In accordance with a further embodiment, the method includes calculating a distance from a point of sale to the at least one mobile device. In some embodiments, the method includes determining a location of the user at the retail location based on the calculated distance and storing the location of the user in a customer record.

In accordance with a further embodiment, the step of determining further includes determining a first set of identifiers, such as MAC addresses for a first set of mobile devices and associating information relating to a first set of payment transactions at a retail location with the first set of MAC addresses and determining a second set of identifiers, such as MAC addresses, of a second set of mobile devices and associating information relating to a second set of payment transactions at a retail location with the second set of identifiers; and determining that a particular identifier (e.g. MAC Address) is associated with the user from whom secure payment information was previously received. In some embodiments, the determinations may be made by comparing information relating to the first set of payment transactions associated with the first set of identifiers with the previously stored information relating to the user in order to identify one or more payment transactions associated with the user; comparing information relating to the second set of payment transactions associated with the second set of identifiers with the previously stored information relating to the user in order to identify one or more payment transactions associated with the user; and identifying an identifier (e.g. MAC Address) associated with the first set and second set of payment transactions associated with the user by identifying the identifier (e.g. MAC address) that is in both the first and second sets of identifiers.

In some embodiments, the method includes determining, based at least in part on a customer record, that the user belongs to a loyalty program and applying loyalty program information to the payment transaction. In some embodiments, a customer may be provided with an incentive via his or her mobile device. An incentive may be any electronic representation of value or enticement capable of being communicated to the customer via a mobile device. In some embodiments, the incentive is a coupon. In some embodiments, the incentive is a coupon that may contain a QR code that may be scanned in order to obtain a discount. In some embodiments the incentive may be a credit to the user's account. In some embodiments, the incentive may be a credit to a customer's account. In some embodiments, the incentive is a discount. In some embodiments, the incentive may be an advertisement. In some embodiments, the incentive may comprise promotional material. In some embodiments, the incentive may be based, at least in part, on information stored in the customer's customer record. In some embodiments, the incentive may be based, at least in part, on a customer's purchase history. In some embodiments, the incentive may be based, at least in part, on a customer's location. In some embodiments, the incentive may be based, at least in part, on a customer's location history. In some embodiments, the incentive is a reminder that the user may use their mobile device to complete the payment utilizing secure payment information previously stored at a secured location remote from retail locations.

In accordance with a further embodiment, the method includes generating promotional information based on at least one of a customer record associated with the user or a current location of the user at the retail location and displaying, to the user, promotional information at a point of sale at the retail location. In some embodiments, the method includes transmitting to the user via the at least one mobile device, promotions for products offered at the retail location. In some embodiments, the method includes transmitting to the user via the at least one mobile device, discounts for purchases made using the at least one mobile device at the retail location.

In accordance with a further embodiment, the method includes receiving information relating to payment transaction at a retail location that was not requested via the user's mobile device, determining a current location at the retail location of the mobile device, and associating information relating to the payment transaction that was not requested via the user's mobile device with the user based at least in part on the determined current location. For example, a customer may walk into a retail location and purchase a product using cash or credit card, rather than via his or her mobile device. In such a situation, the systems and methods of the present disclosure would nonetheless provide for determining a current location of the customer's mobile device and/or and identifier for the mobile device that may be associated with the customer's previously provided account information. In some embodiments, the fuel dispensing location and retail location at which location information was determined are the same location. In some embodiments, the fuel dispensing location and the retail location from which location information was determined are different locations. In some embodiments, the method includes, responsive to determining the location of the user, activating a point of sale location.

In accordance with a further embodiment of the present disclosure, a method for processing payments is provided, the method comprising: receiving, from a user, secure payment information for use in processing future payment transactions initiated by a mobile device; storing secure payment information for the user at a secure location remote from retail locations; detecting MAC addresses for a plurality of mobile devices at a retail location via one or more wireless antennas; determining that at least one mobile device of the plurality of mobile devices is a mobile device of a user based at least in part on the MAC address of the mobile device; providing, to the mobile device of the user, an incentive based at least in part on the determined association between the one mobile device and the user; receiving, from the mobile device, a request to process a payment transaction at a fuel dispensing location; sending at least a portion of the previously stored secure payment information to a remotely located server for authorization; sending to the fuel dispensing location an authorization for the requested payment transaction that does not include secure payment information; and activating s fuel dispensing station at the fuel dispensing location for use by the user.

In accordance with a further embodiment, the step of determining that at least one mobile device of the plurality of mobile devices is the mobile device of the user further includes determining a first set of MAC address of a first set of mobile devices and associating information relating to a first set of payment transactions at a retail location with the first set of MAC addresses, determining a second set of MAC addresses of a second set of mobile devices and associating information relating to a second set of payment transactions at a retail location with the second set of MAC addresses, and determining that a particular MAC address is associated with the user from whom secure payment information was previously received by. In some embodiments, the determination may be made by comparing information relating to the first set of payment transactions associated with the first set of MAC addresses with the previously stored information relating to the user in order to identify one or more payment transactions associated with the user, comparing information relating to the second set of payment transactions associated with the second set of MAC addresses with the previously stored information relating to the user in order to identify one or more payment transactions associated with the user, and identifying a MAC address associated with the first set and second set of payment transactions associated with the user by identifying the MAC address that is in both the first and second sets of MAC addresses.

It should be understood that any portions of the present disclosure that refer "MAC addresses" may alternatively refer to any other form of identifier for a mobile device. For example, any unique identifier, key, or hash that may be assigned to a mobile device and later detected may be utilized in place of a MAC Address. A MAC address (media access control address) is simply an exemplary form of such an identifier that is currently utilized by network connected devices.

In some embodiments, the method further includes comparing the MAC addresses from a current transaction to a customer record comprising MAC addresses from a previous transaction associated with the user, eliminating MAC addresses from the customer record not in both the current transaction and the previous transaction, and linking the remaining MAC addresses to the user in the customer record. In some embodiments, the method includes calculating a distance from a point of sale to the at least one mobile device. In some embodiments, the method includes determining a location of the user at the retail location based on the calculated distance and storing the location of the user at the retail location in a customer record. In some embodiments, the method includes activating the point of sale location.

In accordance with a further embodiment, the method includes determining, based at least in part on a customer record, that the user belongs to a loyalty program and applying loyalty program information to the payment transaction. In some embodiments, the method includes generating promotional information based on at least one of a customer record associated with the user or a current location of the user at the retail location and displaying, to the user, promotional information at a point of sale at the retail location.

In some embodiments, the method includes storing in a customer record at least one of: a MAC address of the at least one mobile device; a purchase history of the user; or point of sale location information. In some embodiments, the method includes transmitting to the user via the at least one mobile device, at least one of promotions for products offered at the retail location or discounts for purchases using the at least one mobile device at the retail location. In some embodiments, the method includes transmitting to the user via the at least one mobile device, discounts for purchases made using the at least one mobile device at the retail location.

In accordance with a further embodiment of the present disclosure a system for processing payments. The system includes at least one processing unit communicatively coupled to a memory unit capable of storing processor-executable instructions, wherein upon execution of the processor-executable instructions. The at least one processing unit: receiving, from a user, secure payment information for use in processing future payment transactions initiated by a mobile device; storing secure payment information for the user at a secure location remote from retail locations; determining location information associated with a mobile device based at least in part on the strength of the signal detected by three or more wireless antennas at a retail location; determining that the mobile device is associated with a user who previously provided payment information for use in processing payment transactions; and providing, to the mobile device of the user, an incentive based at least in part on the determined location information.

The system further includes a determined server comprising at least one processing unit communicatively coupled to a memory unit capable of storing processor-executable instructions. The at least one processing unit: receiving, from the mobile device, a request to process a payment transaction at a fuel dispensing location; sending at least a portion of the previously stored secure payment information to a remotely located server for authorization; sending to the fuel dispensing location an authorization for the requested payment transaction that does not include secure payment information; and activating a fuel dispensing station at the fuel dispensing location for use by the user.

In accordance with a further embodiment of the present disclosure a system for processing payments. The system includes at least one processing unit communicatively coupled to a memory unit capable of storing processor-executable instructions, wherein upon execution of the processor-executable instructions. The at least one processing unit: receiving, from a user, secure payment information for use in processing future payment transactions initiated by a mobile device; storing secure payment information for the user at a secure location remote from retail locations; detecting MAC addresses for a plurality of mobile devices at a retail location via one or more wireless antennas; determining that at least one mobile device of the plurality of mobile devices is a mobile device of a user based at least in part on the MAC address of the mobile device; and providing, to the mobile device of the user, an incentive based at least in part on the determined association between the one mobile device and the user.

The system further includes a determined server comprising at least one processing unit communicatively coupled to a memory unit capable of storing processor-executable instructions. The at least one processing unit: receiving, from the mobile device, a request to process a payment transaction at a fuel dispensing location; sending at least a portion of the previously stored secure payment information to a remotely located server for authorization; sending to the fuel dispensing location an authorization for the requested payment transaction that does not include secure payment information; and activating a fuel dispensing station at the fuel dispensing location for use by the user.

BRIEF DESCRIPTION OF THE FIGURES

The foregoing and other objects, aspects, features, and advantages of the disclosure will become more apparent and better understood by referring to the following description taken in conjunction with the accompanying drawings, in which.

DETAILED DESCRIPTION

Figure 1:
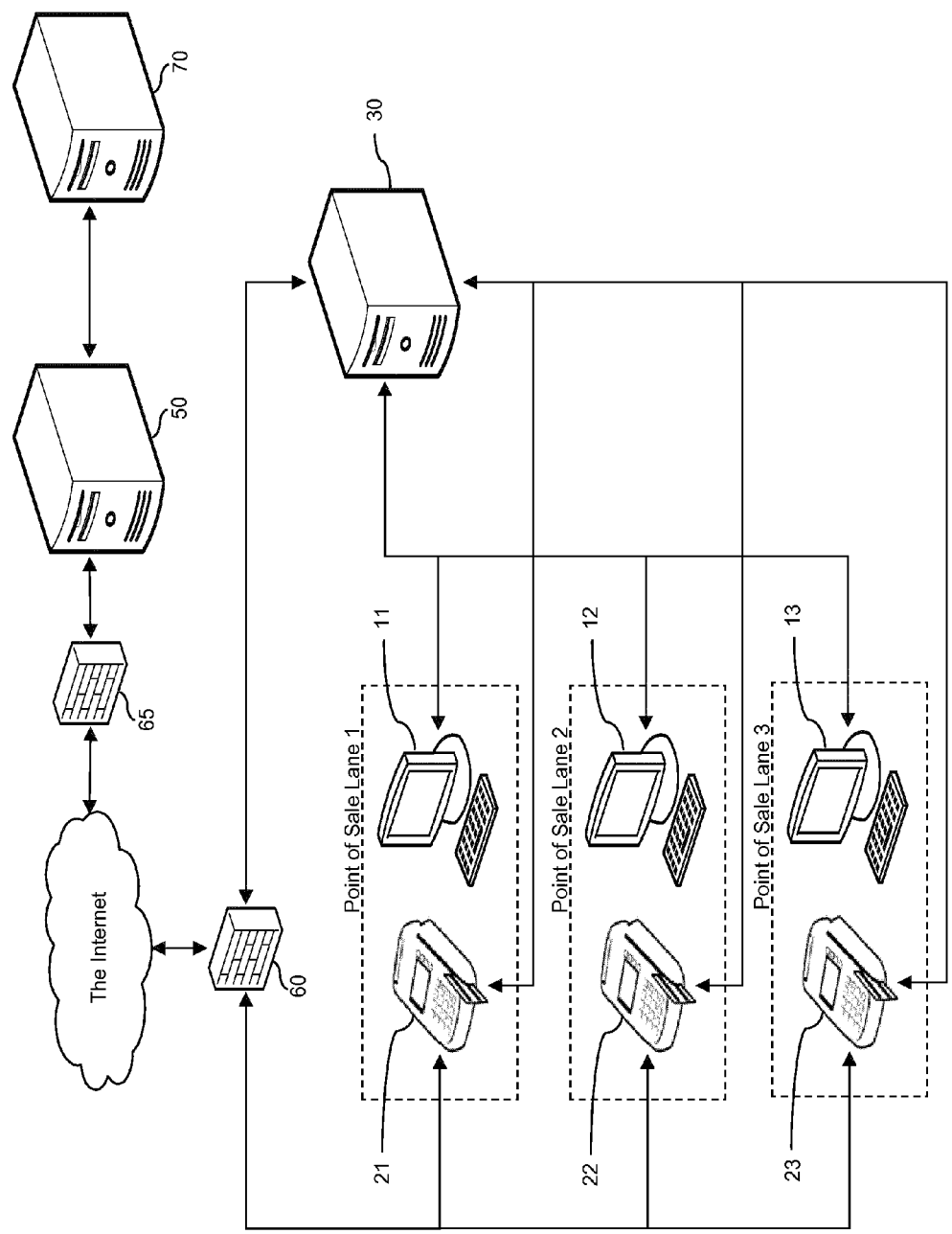
FIG. 1 is a block diagram of a system for processing payment transactions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

In reference now to FIG. 1, a system for processing payment transactions is shown. Point of sale lanes 1, 2, and 3 are in communication with back office server 30. Point of sale lanes may be comprised of any form and combination of point of sale hardware and software, including electronic cash registers, checkout terminals, checkout kiosks, computers, wireless checkout terminals, restaurant ordering kiosks, customized desktop computers, laptops, wireless devices, tablet PCs, smart phones, or any other computing device capable of assisting with payment processing at a retail location. A point of sale lane may be a check-out lane or counter at a department store, grocery store, or other form of retail shopping locations, or it may be a kiosk at a restaurant or counter at a food service retail location, or any other location where a user effectuates the processing of a payment transaction. A point of sale lane may be a fuel dispensing location (e.g., fuel pump and/or a group of fuel dispensing locations. For example, in some embodiments, a point of sale location may be a fuel pump at a gas station. A back office server 30 may be a single server, a plurality of servers, a server farm, or an allocation of computing services provided by a cloud based provider of computer services. In some embodiments, server 30 may be a plurality of servers operated by a plurality of different parties, entities, and service providers. The back office server 30 may be located at the retail location or at a remote location.

In some embodiments, point of sale lanes may comprise electronic cash registers 11, 12, and 13, which are in communication with the back office server 30. Electronic cash registers 11, 12 and 13, may be any form of computing device capable of assisting a user in effectuating the processing of a payment transaction. Electronic cash registers may be any one of or combination of point of sale hardware and software, computerized cash register, checkout terminals, checkout kiosks, computers, wireless checkout terminals, wireless computers, restaurant ordering kiosk computers, checkout kiosk computers, payment processing kiosk computers, customized desktop computers, laptops, wireless devices, tablet PCs, smart phones, iPhones or iPads as provided by the Apple Corporation, or any other computing device capable of assisting a user with payment processing at a retail location. In some embodiments, communications between electronic cash registers 11, 12, and 13 and server 30 are encrypted. In some embodiments, communications between electronic cash registers 11, 12, and 13 and server 30 are encrypted using public-private key encryption. In some embodiments, communications between electronic cash registers 11, 12, and 13 and server 30 are encrypted using shared secret key encryption. In some embodiments, communications between electronic cash registers 11, 12, and 13 and server 30 are encrypted using Secure Socket Layer (SSL) or Transport Layer Security (TLS) protocols. In some embodiments, communications between electronic cash registers 11, 12, and 13 and server 30 are encrypted using a proprietary encryption scheme. In some embodiments, communications between electronic cash registers 11, 12, and 13 and server 30 may occur, at least in part, wirelessly.

The back office server 30 is in communication with credit card terminals 21, 22 and 23 which are located at the point of sale lanes. In some embodiments, the communication between credit card terminals 21, 22 and 23 and server 30 may be limited to a single isolated port for communication of non-PCI scope information. In some embodiments the single isolated port may be a TCP/IP or UDP port. In some embodiments, communications between credit card terminals 21, 22, and 23 and server 30 are encrypted. In some embodiments, communications between credit card terminals 21, 22 and 23 and server 30 are encrypted using public-private key encryption. In some embodiments, communications between credit card terminals 21, 22 and 23 and server 30 are encrypted using shared secret key encryption. In some embodiments, communications between credit card terminals 21, 22 and 23 and server 30 are encrypted using Secure Socket Layer (SSL) or Transport Layer Security (TLS) protocols. In some embodiments, communications between credit card terminals 21, 22 and 23 and server 30 are encrypted using a proprietary encryption scheme. In some embodiments, communications between credit card terminals 21, 22 and 23 and server 30 may occur, at least in part, wirelessly.

In some embodiments, communications between credit card terminals 21, 22 and 23 and server 30 may be made utilizing dial-up communications, the Internet, TCP/IP, UDP, General packet radio service (GPRS) communications, cellular communications, Wi-Fi, wireless communications utilizing the IEEE 802.11 standards, other forms of wireless communications, Ethernet, or any other form of communications protocol, channel, or standard.

The credit card terminals 21, 22, and 23 are also in communication with a remotely located payment processing server 50. Server 50 may be a single server, a plurality of servers, a server farm, or an allocation of computing services provided by a cloud based provider of computer services. In some embodiments, server 50 may be a plurality of servers operated by a plurality of different parties, entities, and service providers. In some embodiments, the communication between credit card terminals 21, 22, and 23 and remotely located payment processing server 50 goes through one or both of firewalls 60 and 65. In some embodiments, the communication between credit card terminals 21, 22, 23 and remote server 50 may be additionally monitored by other software or hardware based network monitoring tools. In some embodiments, such network monitoring tools may assure that communications between the credit card terminals and server 50 are not tampered with. In some embodiments, communications between credit card terminals 21, 22, and 23 and server 50 are encrypted. In some embodiments, communications between credit card terminals 21, 22 and 23 and server 50 are encrypted using public-private key encryption. In some embodiments, communications between credit card terminals 21, 22 and 23 and server 50 are encrypted using shared secret key encryption. In some embodiments, communications between credit card terminals 21, 22 and 23 and server 50 are encrypted using Secure Socket Layer (SSL) or Transport Layer Security (TLS) protocols. In some embodiments, communications between credit card terminals 21, 22 and 23 and server 50 are encrypted using a proprietary encryption scheme.

In some embodiments, communications between credit card terminals 21, 22, and 23 and remotely located payment processing server 50 may be made utilizing dial-up communications, the Internet, TCP/IP, UDP, General packet radio service (GPRS) communications, cellular communications, Wi-Fi, wireless communications utilizing the IEEE 802.11 standards, other forms of wireless communications, Ethernet, or any other form of communications protocol, channel, or standard.

In some embodiments, credit card terminals (CCT) 21, 22 or 23 may be terminals that allow customers to swipe or otherwise input credit card information with which to effectuate a payment transaction. In some embodiments, CCTs 21, 22, or 23 may be terminals that allow customers to input any form of payment information that is not credit card information. In some embodiments, CCTs 21, 22, or 23 may be terminals that allow customers to input gift card information, bank account information, or debit card information. In some embodiments, CCTs 21, 22, or 23 may be terminals that allow customers to input payment information from an online payment service provider such as PayPal ®. In some embodiments, CCTs 21, 22, or 23 may be terminals that allow customers to input payment information from a rewards program. For example, a user may input rewards program information and use points or credits to effectuate the payment transaction.

In some embodiments, CCTs 21, 22, or 23 may be terminals that allow customers to input information wirelessly. In some embodiments, CCTs 21, 22, or 23 may be terminals that allow customers to input information through a Radio-Frequency Identification (RFID) device or chip, including use of Near Field Communications (NFC). In some embodiments CCTs 21, 22, or 23 may be terminals that allow customers to input information through a touch pad or key pad. In some embodiments, CCTs 21, 22, or 23 may be terminals that allow customers to input information by swiping a card with a magnetic strip. In some embodiments, CCTs 21, 22, or 23 may be terminals that allow customers to input information by entering in a unique identifier or password. In some embodiments, the terminals utilize a two-step verification such as the use of a wireless device utilizing RFID or the like and a user-entered password.

In some embodiment, CCTs 21, 22, or 23 may be terminals that allow customers to input payment information via their cell phones or other mobile device.

In some embodiments, server 50 is in communication with authorization server 70. Server 70 may be a single server, a plurality of servers, a server farm, or an allocation of computing services provided by a cloud based provider of computer services. In some embodiments, server 70 may be a plurality of servers operated by a plurality of different parties, entities, and service providers. In some embodiments, communications between server 50 and server 70 are encrypted. In some embodiments, communications between server 50 and server 70 are encrypted using public-private key encryption. In some embodiments, communications between server 50 and server 70 are encrypted using shared secret key encryption. In some embodiments, communications between server 50 and server 70 are encrypted using Secure Socket Layer (SSL) or Transport Layer Security (TLS) protocols. In some embodiments, communications between server 50 and server 70 are encrypted using a proprietary encryption scheme. In some embodiments, communications between server 50 and server 70 may occur, at least in part, wirelessly.

In some embodiments, communications between credit card terminals 21, 22 and 23 and remotely located server 50 occur across the public Internet. In some embodiments, communications between credit card terminals 21, 22 and 23 and remotely located server 50 occur across a virtual private network (VPN). In some embodiments, communication between credit card terminals 21, 22 and 23 and remotely located server 50 occur across any form of wide area network. In some embodiments, communications between credit card terminals 21, 22 and 23 and remotely located server 50 occur across a private network. In some embodiments, communications between credit card terminals 21, 22 and 23 and remotely located server 50 may occur, at least in part, wirelessly.

In some embodiments, back office server 30 may be in communication with remotely located payment processing server 50. In some embodiments, the communication between server 30 and remotely located payment processing server 50 goes through one or both of firewalls 60 and 65. In some embodiments, communications between server 30 and server 50 are encrypted. In some embodiments, communications between server 30 and server 50 are encrypted using public-private key encryption. In some embodiments, communications between server 30 and server 50 are encrypted using shared secret key encryption. In some embodiments, communications between server 30 and server 50 are encrypted using Secure Socket Layer (SSL) or Transport Layer Security (TLS) protocols. In some embodiments, communications between server 30 and server 50 are encrypted using a proprietary encryption scheme.

In some embodiments, server 30, 50 and 70 may be in communication with additional storage devices or databases.

Figure 2:
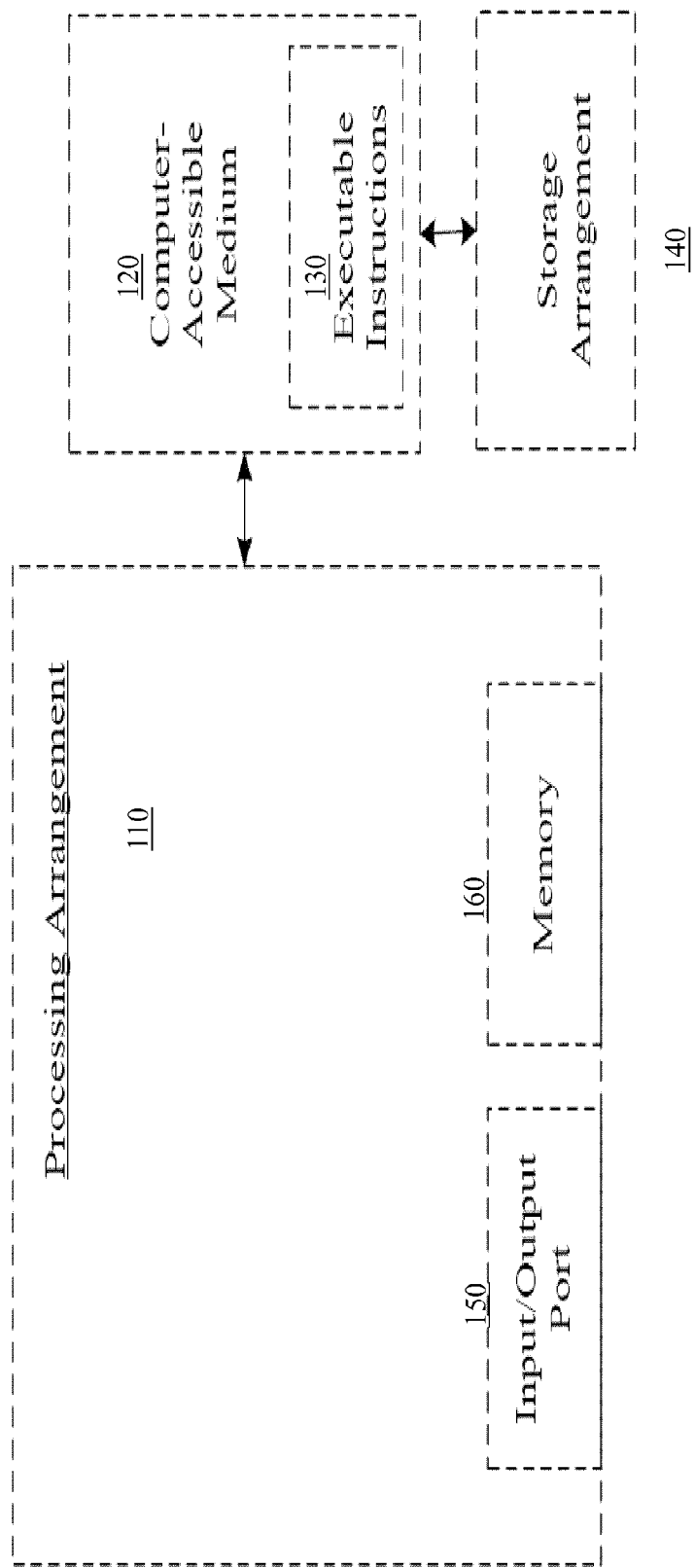
FIG. 2 is a block diagram of an exemplary embodiment of a system for executing computer executable instructions performed by processing arrangement and/or a computing arrangement, according to one embodiment of the present disclosure.

In reference now to FIG. 2, a block diagram of an exemplary embodiment of a system capable of implementing the present disclosure is shown. For example, an exemplary procedure in accordance with the present disclosure can be performed by a processing arrangement 110 and/or a computing arrangement 110. Such processing/computing arrangement 110 can be, e.g., entirely or a part of, or include, but not be limited to, a computer/processor that can include, e.g., one or more microprocessors, and use instructions stored on a computer-accessible medium (e.g., RAM, ROM, hard drive, or other storage device).

As shown in FIG. 2 a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

Figure 3:
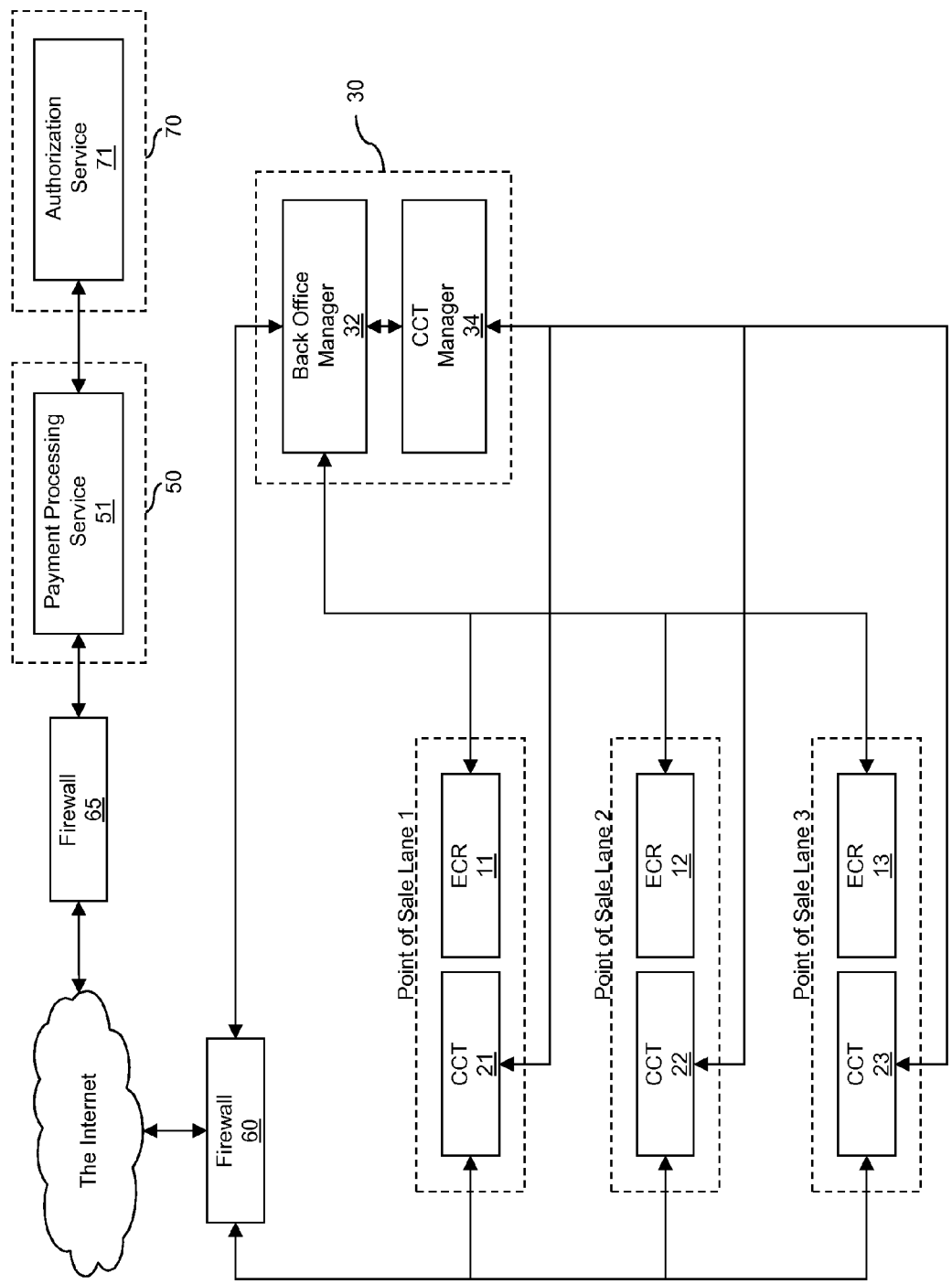
FIG. 3 is a block diagram of a system for processing payment transactions.

In reference now to FIG. 3, back office server 30 is comprised of a back office manager 32 and a credit card terminal (CCT) manager 34. The back office manager 32 may be any computing processor or portion thereof programmed to perform the functions of a back office manager. The CCT manager 34 may be any computing processor or portion thereof programmed to perform the functions of a CCT manager. In some embodiments, the back office manager 32 and CCT manager 34 may comprise a single joint back office manager and CCT manager. In some embodiments, the functions of the CCT manager 34 may be performed by the back office manager 32. In some embodiments, the CCT manager 34 may perform the functions of the back office manager. The back office manager may be in communication with electronic cash registers (ECR) 11, 12, and 13. The back office manager may be in communication with a payment processing server 51 on remote server 50. The payment processing service 51 may be any computing processor or portion thereof programmed to perform the functions of payment processing service. The payment processing service 51 may comprise of a payment gateway. The payment processing service 51 may be a payment gateway.

In some embodiments, the CCT manager 34 is in communication with the back office manager 32, and vice-versa. The CCT manager is further in communication with CCTs 21, 22, and 23. CCTs 21, 22, and 23 are in communication with a payment processing service 51 on remote server 50. In some embodiments, communications between payment CCTs 21, 22, and 23 and payment processing service 51 are routed through one or both of firewalls 60 and 65.

In some embodiments, payment processing service 51 is in communication with authorization service 71 on server 70. The authorization service 51 may be any computing processor or portion thereof programmed to perform the functions of the authorization service. Authorization service 71 may be comprised of a payment gateway. Authorization service 71 may be a payment gateway. In some embodiments, payment processing service 51 and authorization service 71 may be a single service.

In any embodiment, communications between various components of the payment processing system may be made utilizing either one or a plurality of: dial-up communications, the Internet, TCP/IP, UDP, General packet radio service (GPRS) communications, cellular communications, Wi-Fi, wireless communications utilizing the IEEE 802.11 standards, other forms of wireless communications, Ethernet, a packet-switched network, or any other form of communications protocol, channel, or standard.

Figure 4:
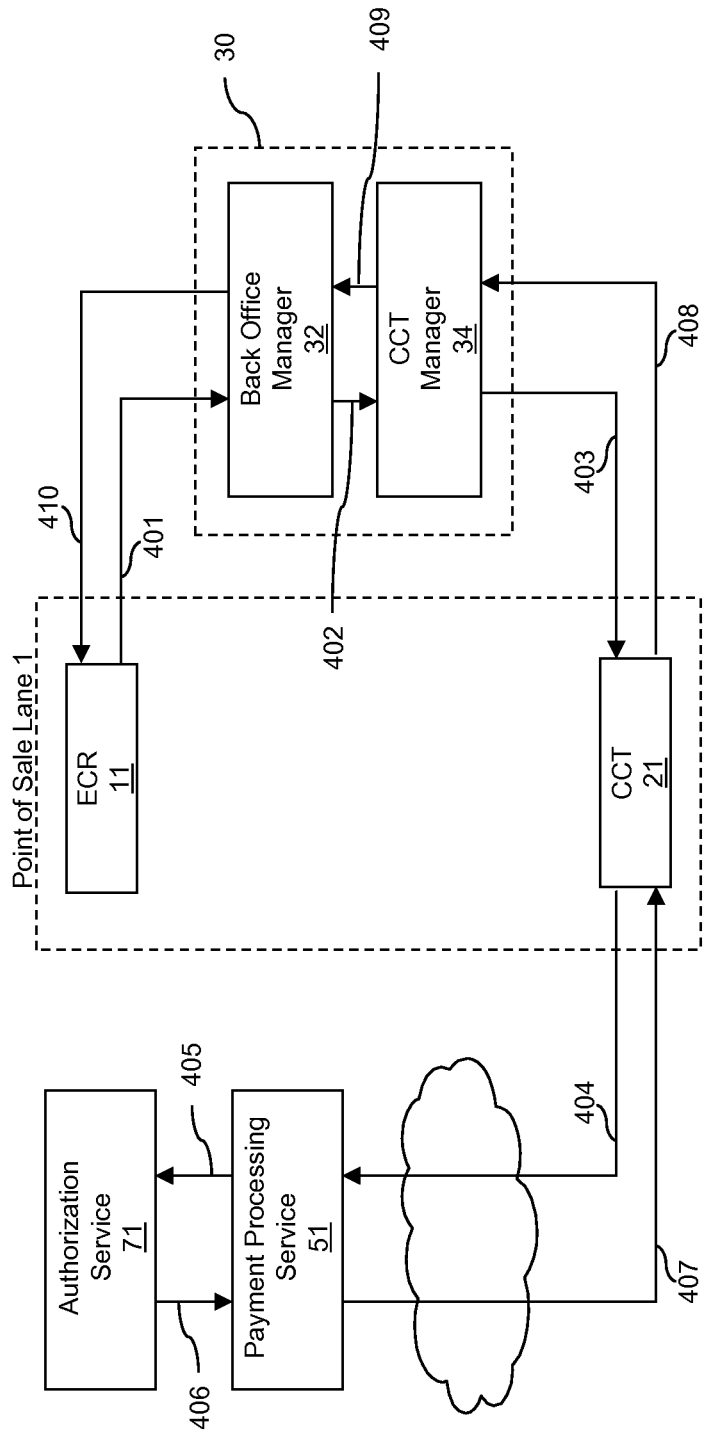
FIG. 4 is a block diagram demonstrating the flow of a method for processing payment transactions.

In reference now to FIG. 4, a flow diagram for processing a payment transaction in the context of the present disclosure is shown. Back office manager 32 receives 401 a request to process a payment transaction from ECR 11. The back office manager 32 may validate and check the request to determine whether the request is consistent with payment processing requirements, and transmits the request to CCT manager 34. CCT manager 34 receives 402 the request from back office manager 32. CCT manager 34 may determine that CCT 21 is associated with the request for processing a payment transaction. CCT manager 34 may send 403 a request to CCT 21 to initiate the receipt of secure payment information. CCT 21 may receive secure payment information from a user, comprising credit card information, debit card information, Personal Identification Number (PIN) information, gift card information, or loyalty program information. CCT 21 sends 404 a request to payment processing service 51 to authorize the payment transaction. Payment processing service 51 receives the request to authorize the transaction, and sends 405 a request to authorization service 71 to authorize the transaction. Payment processing service 51 receives 406 and authorization for the payment transaction from authorization service 71. An authorization may be any form of computer readable indicator that the payment transaction has been authorized or approved by an authorization service. CCT 21 receives 407 an authorization from payment processing service 51 and sends an authorization to CCT Manager 34 which does not include PCI scope information. CCT Manager 34 receives 408 an authorization from CCT 21, which does not include PCI scope information. The CCT manager sends an authorization to back office manager 32. Back office manager 32 receives 409 an authorization from CCT Manager 34. Back office manager 32 sends 410 an authorization for the payment transaction to ECR 11.

In some embodiments, back office manager 32 may operate in listening mode, whereby it periodically determines whether a request to process a payment transaction has been received, or whether an authorization or other message has been received. In some embodiments, back office server 30 may operate entirely in listening mode, whereby it periodically determines whether a request, authorization, message, or signal has been received. In some embodiments, at least one module or process running on back office server 30 may operate in listening mode while other modules or processes do not operate in listening mode. In some embodiments, CCT Manager 34 may operate in listening mode, whereby it periodically determines whether a request to process a payment transaction has been received, or whether an authorization or other message has been received. In some embodiments CCT 21 may operate in listening mode, whereby it periodically determines whether a request to process a payment transaction has been received, or whether an authorization or other message has been received. In some embodiments ECR 11 may operate in listening mode, whereby it periodically determines whether a request to process a payment transaction has been received, or whether an authorization or other message has been received. In some embodiments, the periodicity with which a device, module, or process operates in listening mode may be so short so as to allow an action to be taken in response to receiving a request, authorization, or message nearly instantaneously.

In some embodiments, an authorization may be a secure packet of information indicating that the payment has been authorized. In some embodiments, an authorization may be an unsecure packet of information indicating that the payment has been authorized. In some embodiments, an authorization may be an address in memory that indicated that a payment has been authorized. In some embodiments, an authorization may be an electronic message that indicated that a payment has been authorized. In some embodiments, and authorization may be a request that the credit card terminal complete the payment processing transaction. In some embodiments, an authorization may change format between Authorization Service 71, Payment Processing Service 51, Firewall 65, Firewall 60, CCT 21, CCT Manager 34, Back Office Manager 32, and ECR 11. For example, an authorization received by Payment Processing Service 51 may be a request by Authorization Service 71 for Payment Processing Service 51 to effectuate the processing of the payment transaction. In turn, Payment Processing Service 51 may communicate the authorization to CCT 21 in the form of a request for CCT 21 to effectuate the processing of a payment transaction. In turn, CCT 21 may communicate an authorization to CCT Manager 34 in the form of a message to CCT Manager 34 informing CCT Manager 34 that the transaction has been authorized. In turn, CCT Manager 34 may communicate an authorization to Back Office Manager 32 in the form of a request to Back Office Manager 32 to effectuate the processing of a payment transaction. In turn, Back Office Manager 32 may communicate an authorization to ECR 11 in the form of a request to ECR 11 to effectuate the processing of a payment transaction, such as a request to print out a receipt for a customer. In an alternative embodiment, an authorization may be a single packet of data, file, or message which is sent from Authorization Service 71, and forwarded to Payment Processing Service 51, then forwarded to CCT 21, then forwarded to CCT Manager 34, then forwarded to Back Office Manager 32, and forwarded to ECR 11.

In some embodiments, an authorization may be communicated across a different communications link than that on which a request for authorization is communicated.

Figure 5A:
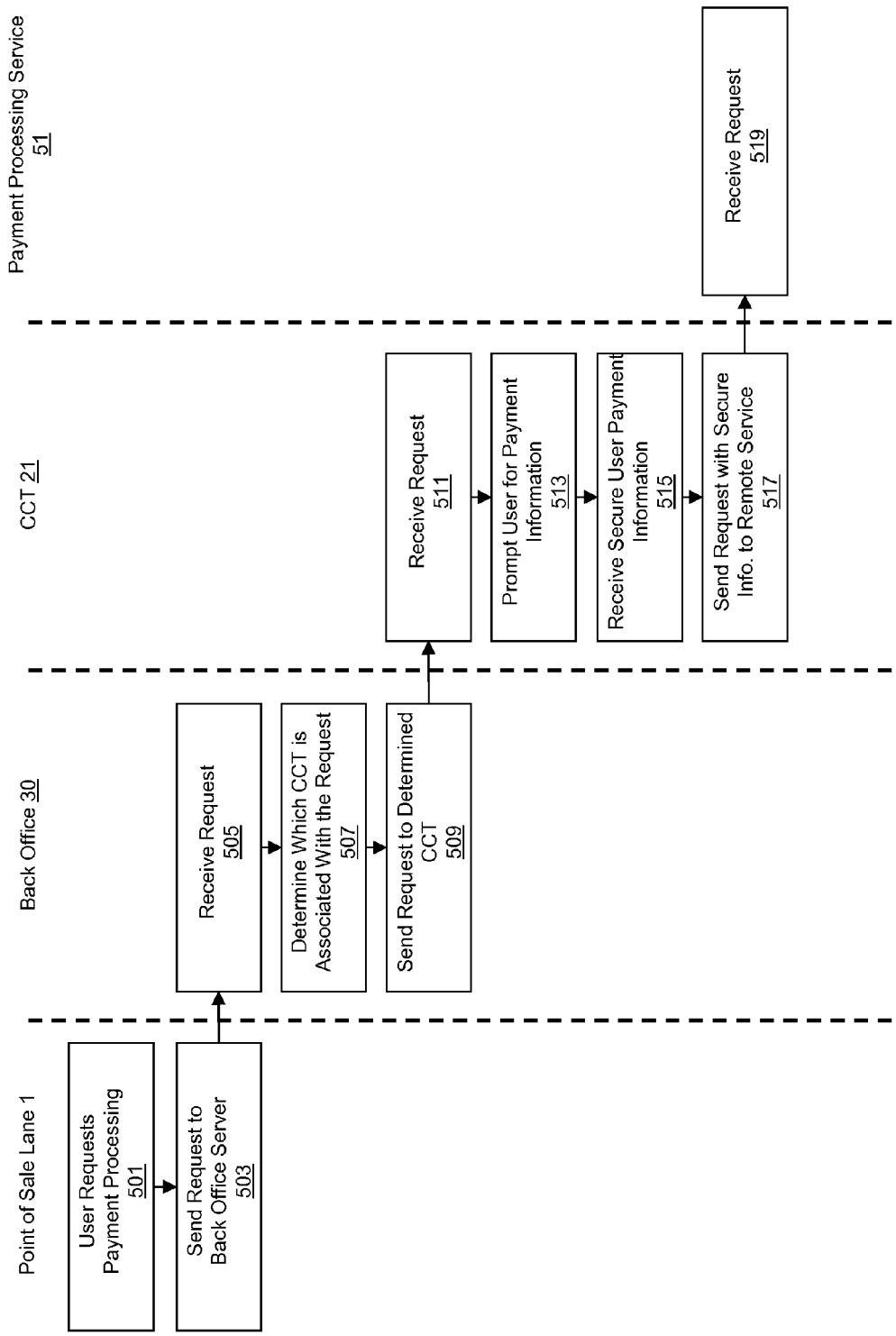
FIG. 5A is a flow diagram of a method for processing payment transactions.

In reference now to FIG. 5A, a flow diagram for a method for processing payment transactions is depicted. At a point of sale lane, a user requests 501 processing of a payment transaction. Further at the point of sale, a request is sent 503 to the back office server 30 to effectuate the processing of the payment transaction. Back office server 30 receives 505 a request to process a payment transaction. Back office server 30 determines 507 which of a plurality of CCTs at a retail location is associated with the request. Back office server 30 sends 509 a request to the determined CCT to effectuate payment processing. The determined CCT 21 receives 511 the request to effectuate payment processing. The determined CCT 21 prompts 513 a user to enter payment information. Payment information may be comprised of credit card information, debit card information, PIN information, gift card information, or loyalty program information. The determined CCT 21 receives 515 secure user payment information. The determined CCT sends 517 secure payment information to remotely located payment processing service 51 along with a request to authorize the payment transaction. Remote payment processing service 51 receives 519 the payment information and request for authorizing the payment transaction.

Figure 5B:
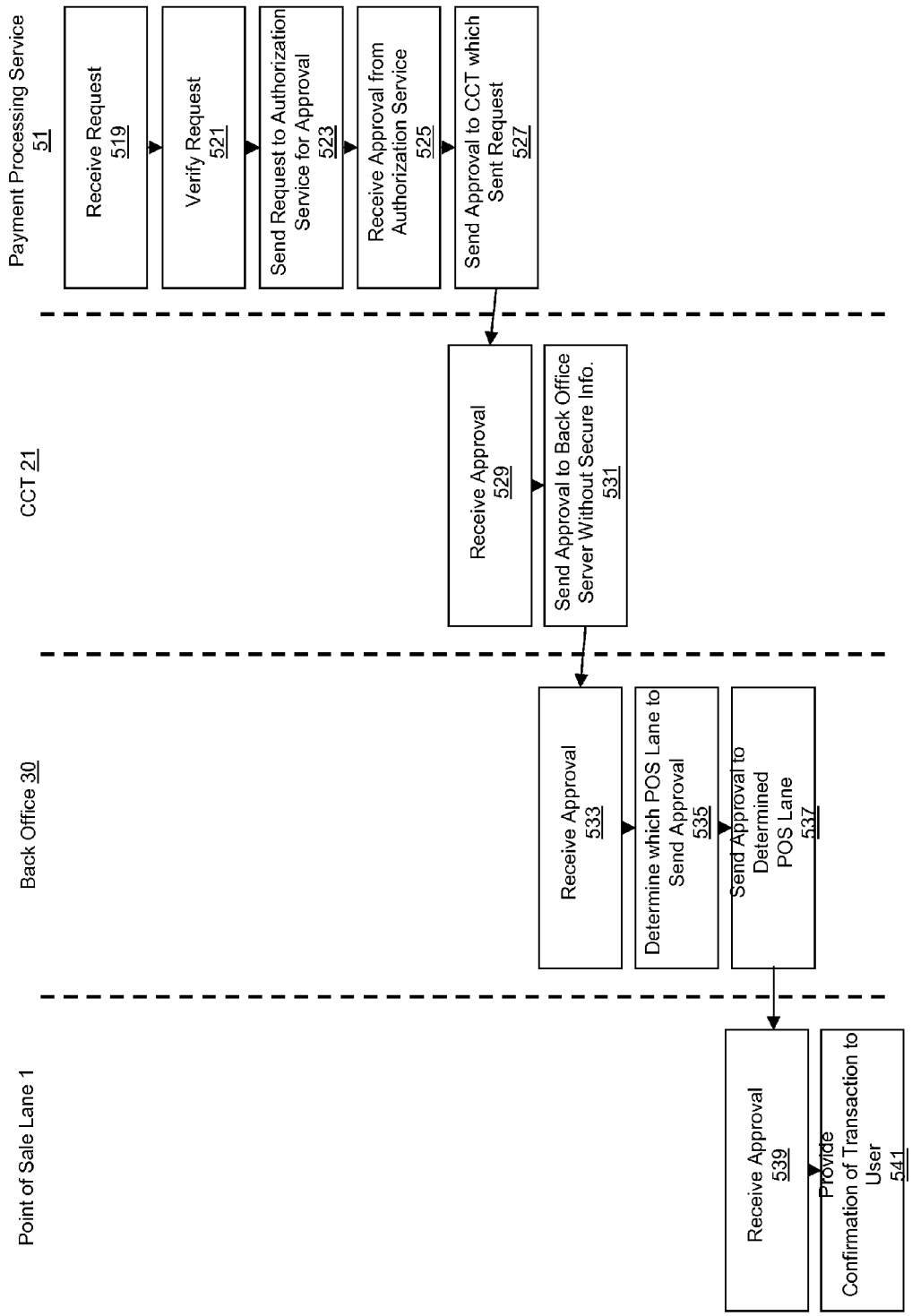
FIG. 5B is a flow diagram of a method for processing payment transactions.

In reference now to FIG. 5B, a flow diagram for a method for processing payment transactions is depicted. Payment processing service 51 receives 519 the payment information and request for authorizing the payment transaction. Payment processing service 51 verifies 521 the request. Payment processing service 51 sends 523 a request for authorization of the payment transaction to authorization service 71 for approval. Payment processing service 51 receives 525 an approval or authorization for the payment transaction from the authorization service 71. Payment processing service 51 sends 527 an approval or authorization for the payment transaction to the determined CCT 21. The determined CCT 21 receives 529 an approval or authorization for the payment transaction. The determined CCT 21 sends 531 an approval or authorization to back office server 30 without PCI scope information. Back office server 30 receives 533 an approval or authorization for the payment transaction without PCI scope information. Back office server 30 determines 535 that one of a plurality of point of sale lanes is associated with the approval or authorization. Back office server 30 sends 541 an approval or authorization to the determined point of sale lane. At the point of sale lane, an approval or authorization is received 539. At the point of sale lane, a confirmation of the payment transactions is provided 541 to a user.

Figure 6A:
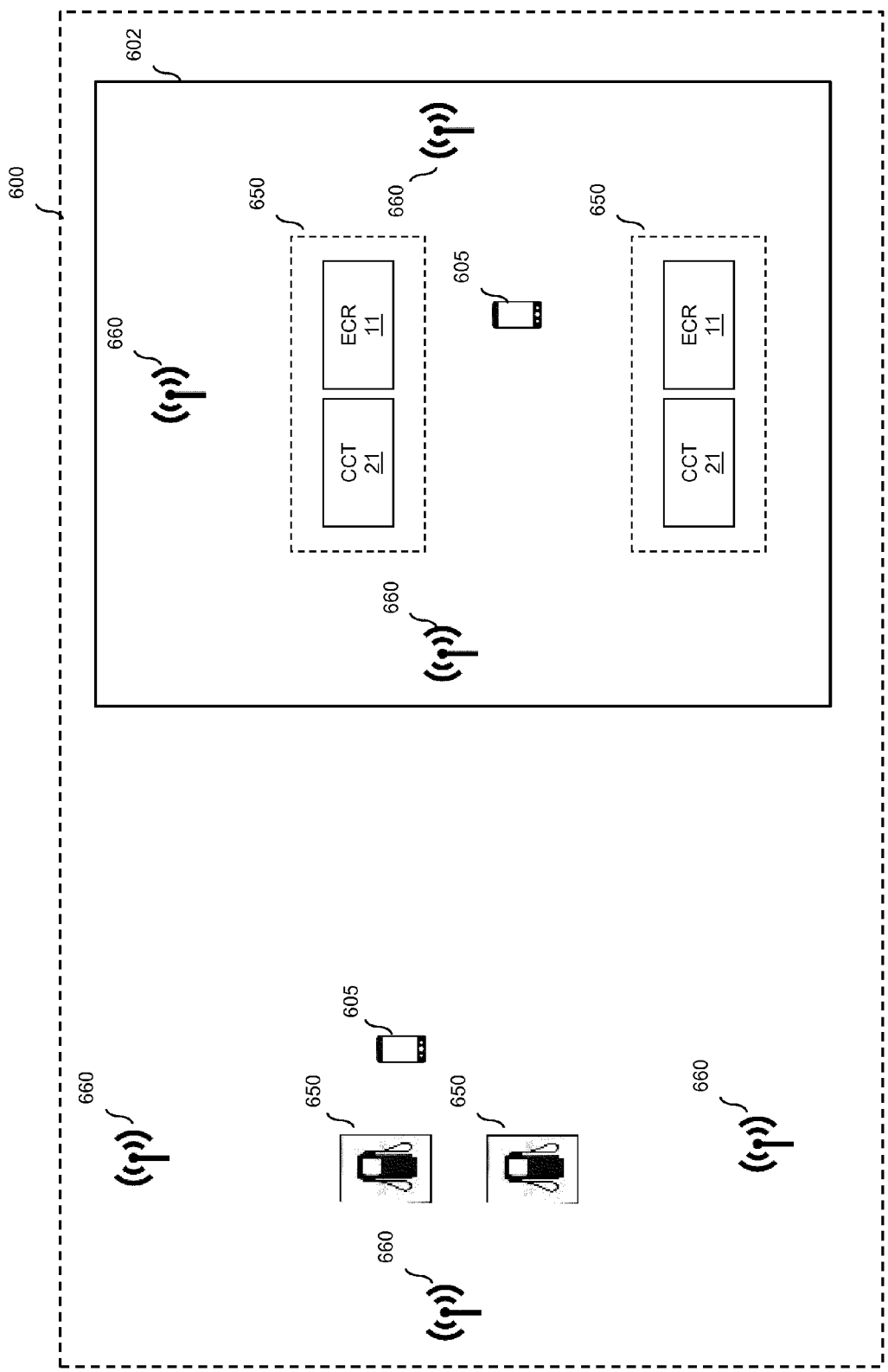
FIG. 6A is a block diagram of a system for detecting mobile devices at a retail location.

In reference now to FIG. 6A, a system for detecting mobile devices at a retail location is shown. A retail location 600 may refer to a point of sale lane and/or a retail store, for example and without limitation a convenience store, a fuel dispensing station, a petrol station, or a small store. In other embodiments, a retail location 600 may be a group of fuel dispensers. In some embodiments said fuel dispensers may be fuel pumps. In some embodiments the retail location 600 may include both a retail store, for example a convenience store, and one or more fuel dispensing stations. In some embodiments, a retail location 600 may be a single fuel dispensing location (e.g., fuel pump). In some embodiments, a retail location 600 may include a traditional point of sale, for example a cash register inside the retail location 600.

In some embodiments, the retail location 600 may include a retail store 602, a plurality of point of sale locations 650, and a plurality of antennas 660. In some embodiments, a retail store 602 may refer to a convenience store, a fuel dispensing station, a petrol station, or a small store. In one embodiment, a retail store 602 may refer to a store location at a retail location 600, for example and without limitation, a convenience store at a gas station. In some embodiments, a retail store may include one or more than one antennas inside the retail store 602. In some embodiments, the retail store may include one or more than one point of sale locations 650.

In some embodiments, a point of sale location 650 may include a gas pump and/or a fueling pump at a retail location 600 such as a fuel dispensing station. In some embodiments, a point of sale location 650 may be a group of fuel dispensers. In some embodiments said fuel dispensers may be fuel pumps. In some embodiments, a point of sale location 650 may include one or more fuel dispensing stations. In some embodiments, a point of sale location 650 may be a single fuel dispensing location (e.g., fuel pump). In some embodiments, a point of sale location 650 may include any form and combination of point of sale hardware and software, including electronic cash registers, checkout terminals, checkout kiosks, computers, wireless devices, tablet PCs, smart phones, or any other computing device capable of assisting with payment processing at a retail location 600. A point of sale location 650 may be a check-out lane or counter at a department store, grocery store, or other form of retail shopping locations, for example and without limitation, inside a retail store 602. In some embodiments, a point of sale location 650 may be a kiosk at a restaurant or counter at a food service retail location, or any other location where a user effectuates the processing of a payment transaction. In some embodiments, a point of sale location 650 may be a traditional point of sale (i.e., cash register in a retail location) as well as fueling pump (i.e., gas pump at a retail location). In some embodiments, a point of sale location 650 may include a credit card terminal (CCT) 21 and/or an electronic cash register (ECR) 11, similar to those described above with respect to FIGS. 3 and 4.

In some embodiments, a retail location 600 may include a plurality of antennas 660. An antenna 660 may be a device used to transmit and/or receive radio, television, microwave, and satellite signals. In some embodiments, the antenna 660 may be an electrical device that converts radio-frequency (RF) fields into alternating current (AC) and/or and vice versa. In some embodiments, the antenna 660 may be used with a radio transmitter or a radio receiver. In some embodiments, the antenna 660 may be used in computer and/or internet wireless applications.

In some embodiments, a retail location 600 may include a single antenna 660. In some embodiments, a retail location 600 includes a set of antennas 660. In some embodiments, one or more antennas 660 may be arranged inside of a retail store 602 at a retail location 600. In some embodiments, one or more antennas 660 may be arranged outside of a retail store 602, but at a retail location 600. In some embodiments, the antennas 660 are arranged in a triangular shape at a retail location 600. In some embodiments, the antennas are arranged around a plurality of point of sale locations 650 at the retail location 600. The set of antennas 660 may detect a signal within a range from the retail location 600. In some embodiments, the set of antennas 660 may detect a signal from a mobile device 605 within a range of the retail location 600. For example, as illustrated in FIG. 6A, a first set of antennas 660 may be arranged in a triangular formation inside of a retail store 602 to detect a mobile device 605 and a second set of antennas 660 may be arranged in a triangular formation outside the retail store 602, but around fuel dispensing locations 650 to detect a mobile device 605.

In some embodiments, the range may be based on the property boundaries of the retail location 600. In some embodiments, the range may be based on the location of various points of sale locations 650 at the retail location 600, for example and without limitation, inside of the retail store 602 and outside the retail store 602. In some embodiments, the range may be a distance around the retail location 600. In some embodiments, a set of antennas 660 may detect a signal from more than one mobile device 605. An antenna 660 may detect any number of mobile devices 605 that are within a range of the antenna 660.

Figure 6B:
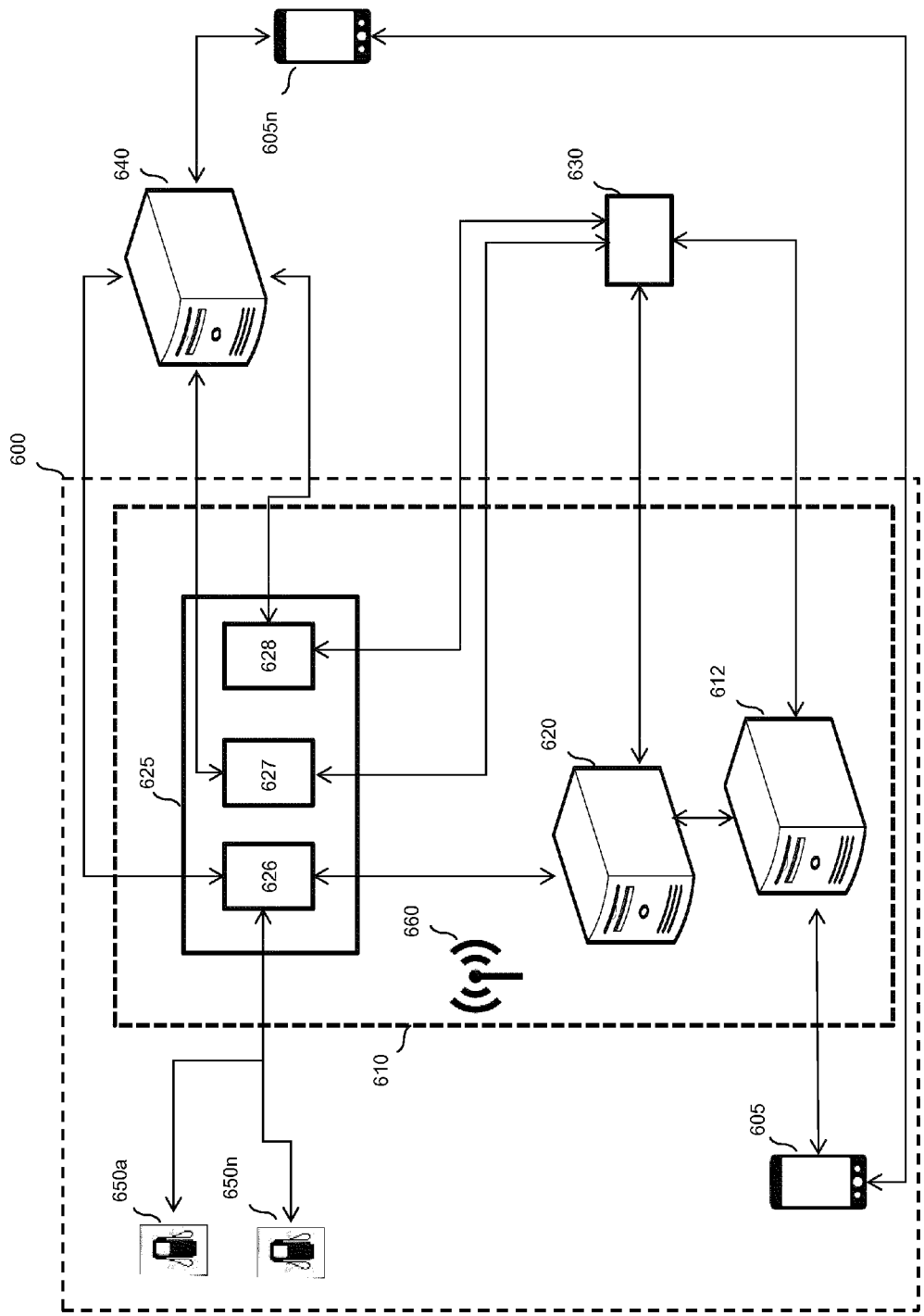
FIG. 6B is a block diagram of a system for processing electronic payments.

In reference now to FIG. 6B, a system for processing electronic payments is shown. A mobile device 605 is in communication with a remote server 630 via back office servers 610 at a retail location 600. The back office servers 610 are in communication with a point of sale server 640 and point of sale locations 650*a-n*.

The mobile device 605 may be any type of computing device, for example and without limitation, a laptop or notebook computer, a server, a handheld computer, a mobile telephone, a portable telecommunication device, a personal digital assistant, a smartphone, a media playing device, a gaming system, a mobile computing device, a device of the IPOD family of devices manufactured by Apple Computer or any other type and/or form of computing telecommunications or media device that is capable of communication and that has sufficient processor power and memory capacity to perform the methods and systems described herein.

In some embodiments, the mobile device 605 may be operated by a user at a retail location 600. A mobile application may be executing on the mobile device 605. The mobile application may be a program or a group of programs designed for an end-user. In some embodiments, the mobile application is a computer application and/or a software application. In an embodiment, the mobile device 605 is in communication with the back office servers 610. In some embodiments, the mobile device 605 is in communication with the back office servers 610 via a wireless connection. In some embodiments, communications between the mobile device 605 and the back office servers 610 occur across a network. The network can be a WAN, LAN, or any other embodiment of a network such as those described above. In some embodiments, communications between the mobile device 605 and the back office servers 610 occur across the public Internet. In some embodiments, communications between the mobile device 605 and the back office servers 610 occur across a virtual private network (VPN). In some embodiments, communication between the mobile device 605 and the back office servers 610 occur across any form of wide area network. In some embodiments, communications between the mobile device 605 and the back office servers 610 occur across a private network.

In some embodiments, communications between the mobile device 605 and the back end servers 610 are encrypted using shared secret key encryption. In some embodiments, communications between the mobile device 605 and the back end servers 610 are encrypted using Secure Socket Layer (SSL) or Transport Layer Security (TLS) protocols. In some embodiments, communications between the mobile device 605 and the back end servers 610 are encrypted using a proprietary encryption scheme.

In some embodiments, the back office servers 610 may be a single server, a plurality of servers, a server farm, or an allocation of computing services provided by a cloud based provider of computer services. In some embodiments, back office servers 610 may be a plurality of servers operated by a plurality of different parties, entities, and service providers. The back office servers 610 may be located at the retail location 600 or at a remote location.

In some embodiments, the back office servers 610 may further include a back end server 612, a server 620 and a server 625. It should be understood that these separate servers, while provided separately in FIG. 6B for the sake of explanation, may be combined into a single server providing all the same functionality presently described by the separate servers disclosed in FIG. 6B, or may be further separated into even more components than those described in FIG. 6B. The mobile device 605 may communicate with the server 612, the server 620, and the server 625. In some embodiments, the servers 612, 620, 625 of the back office server are in communication with each other via a wireless connection. In some embodiments, the servers 612, 620, 625 are in communication with each other via a wired connection. In some embodiments, communication between the servers 612, 620, 625 occurs across a network. The network can be a WAN, LAN, or any other embodiment of a network such as those described above. In some embodiments, communication between the servers 612, 620, 625 occurs across the public Internet. In some embodiments, communication between the servers 612, 620, 625 occurs across a virtual private network (VPN). In some embodiments, communication between the servers 612, 620, 625 occurs across any form of wide area network. In some embodiments, communication between the servers 612, 620, 625 occurs across a private network.

In some embodiments, communication between the servers 612, 620, 625 is encrypted using shared secret key encryption. In some embodiments, communication between the servers 612, 620, 625 is encrypted using Secure Socket Layer (SSL) or Transport Layer Security (TLS) protocols. In some embodiments, communication between the servers 612, 620, 625 is encrypted using a proprietary encryption scheme.

In some embodiments, the back office servers 610 include a server 612 that is a back end server for the mobile application executing on the mobile device 605. In some embodiments, the server 612 handles direct communication with the mobile device 605. In some embodiments, the server 612 may be a single server, a plurality of servers, a server farm, or an allocation of computing services provided by a cloud based provider of computer services. In some embodiments, server 612 may be a plurality of servers operated by a plurality of different parties, entities, and service providers. The server 612 may be located at the retail location 600 or at a remote location.

In some embodiments, the server 612 may be in communication with the remote server 630. In some embodiments, the server 612 is in communication with the remote server 630 via a wireless connection. In some embodiments, communications between the server 612 and the remote server 630 occur across a network. The network can be a WAN, LAN, or any other embodiment of a network such as those described above. In some embodiments, communications between the server 612 and the remote server 630 occur across the public Internet. In some embodiments, communications between the server 612 and the remote server 630 occur across a virtual private network (VPN). In some embodiments, communication between the server 612 and the remote server 630 occur across any form of wide area network. In some embodiments, communications between the server 612 and the remote server 630 occur across a private network.

In some embodiments, communications between the server 612 and the remote server 630 are encrypted using shared secret key encryption. In some embodiments, communications between the server 612 and the remote server 630 are encrypted using Secure Socket Layer (SSL) or Transport Layer Security (TLS) protocols. In some embodiments, communications between the server 612 and the remote server 630 are encrypted using a proprietary encryption scheme.

In some embodiments, the back office server includes a switch server 620 that is a switch between the server 612, the server 625, and the remote server 630. The switch server 620 may include a temporary database to store a transaction status of a transaction. In some embodiments, the switch server 620 may be a single server, a plurality of servers, a server farm, or an allocation of computing services provided by a cloud based provider of computer services. In some embodiments, the switch server 620 may be a plurality of servers operated by a plurality of different parties, entities, and service providers. The switch server 620 may be located at the retail location 600 or at a remote location.

In some embodiments, the switch server 620 may be in communication with the remote server 630. In some embodiments, the switch server 620 is in communication with the remote server 630 via a wireless connection. In some embodiments, communications between the switch server 620 and the remote server 630 occur across a network. The network can be a WAN, LAN, or any other embodiment of a network such as those described above. In some embodiments, communications between the switch server 620 and the remote server 630 occur across the public Internet. In some embodiments, communications between the switch server 620 and the remote server 630 occur across a virtual private network (VPN). In some embodiments, communication between the switch server 620 and the remote server 630 occur across any form of wide area network. In some embodiments, communications between the switch server 620 and the remote server 630 occur across a private network.

In some embodiments, communications between the switch server 620 and the remote server 630 are encrypted using shared secret key encryption. In some embodiments, communications between the switch server 620 and the remote server 630 are encrypted using Secure Socket Layer (SSL) or Transport Layer Security (TLS) protocols. In some embodiments, communications between the switch server 620 and the remote server 630 are encrypted using a proprietary encryption scheme.

The remote server 630 may be a central server for a cloud based payment system. The remote server 630 may be remotely located from a retail location 600. In some embodiments, the remote server 630 may be a single server, a plurality of servers, a server farm, or an allocation of computing services provided by a cloud based provider of computer services. In some embodiments, the remote server 630 may be a plurality of servers operated by a plurality of different parties, entities, and service providers.

In some embodiments, the operating system for the remote server 630 is a CentOS based operating system. CentOS is a community Linux distribution based on Red Hat Enterprise Linux (RHEL). In some embodiments, the CentOS version running on the remote server 630 is a CentOS 6.5 32bit version. In some embodiments, the CentOS is composed of software packages distributed under free software licenses and the source code for these packages is made public by Red Hat.

In some embodiments, the back office server includes a server 625 that is a control box and/or a primary server. In some embodiments, the server 625 may be a single server, a plurality of servers, a server farm, or an allocation of computing services provided by a cloud based provider of computer services. In some embodiments, the server 625 may be a plurality of servers operated by a plurality of different parties, entities, and service providers. The server 625 may be located at the retail location 600 or at a remote location.

In some embodiments, the server 625 may be a computing device, for example and without limitation: a computing workstation, a desktop computer, a laptop or notebook computer, a server, a handheld computer, a mobile telephone, a portable telecommunication device, a media playing device, a gaming system, a mobile computing device, or any other type and/or form of computing, telecommunications or media device that is capable of communication and that has sufficient processor power and memory capacity to perform the methods and systems described herein. In some embodiments, the server 625 is a fan-less small computing device.

In some embodiments, the server 625 includes a minimum hardware configuration of 1 GB RAM, 16 GB hard drive disk, Intel Pentium M processor or 1.4 GHz, NIC Ethernet of 10/100, RS232 and RS285 converters, PCI serial card.

In some embodiments, the back office servers 610 further include a panel box. The panel box may reduce the number of cables connected to the back office servers 610 and/or the server 625. In one embodiment, the panel box reduces the number of cables connected to the server 625 from 3 to 1. In some of embodiments, in case of a malfunction of the server 625, the panel box can be used to put the payment system on Bypass mode. Bypass mode may allow normal communication between the point of sale servers and the point of sale locations. In some embodiments, the panel box may be used to troubleshoot any issues related to the server 625 and/or back office servers 610 and allow the retail location 600 to stay fully functional. In some embodiments, the panel may allow a retail location 600 to isolate from the back office servers 610 and/or server 625.

In some embodiments, the server 625 uses packages to run the related applications. For example and without limitation, some of the packages used to run the applications executing on the whizPetro system include Java (JDK 6), GCC a C language compiler, and OpenSSL for encryption.

The server 625 may include applications 626, 627, 628, executing on the server 625. In some embodiments, the applications 626, 627, 628 may be individual java applications. A java application can be a computer program that is programmed using java language. The java applications can run on any operating system, for example and without limitation, Windows, Solaris, Linux, or OS X. Each of the java applications may perform different functions (tasks) for the server 625. In one embodiment, the server 625 includes three individual java applications.

In some embodiments, multiple applications 626, 627, 628 may be executing on the server 625. In an embodiment, each application 626, 627, 628 may be assigned and perform a different function for the server 625. In other embodiments, each application 626, 627, 628 is configured to perform the same functions. In some embodiments, each application 626, 627, 628 executing on the computing device 625 may be assigned a terminal ID, also referred to as a whizpay terminal ID.

In some embodiments, a first application 626 may be an application executing on the server 625. In some embodiments, the application 626 may be a communication point between the server 620, point of sale server 640, and point of sale locations 650*a-n*. The application 626 may receive and transmit information for the server 625 to the point of sale server 640, the point of sale locations 6502*a-n*, and the server 620.

In some embodiments, the application 626 can be communicatively coupled to multiple point of sale locations 650*a-n* at one time. In one embodiment, the application 626 is communicatively coupled with up to 8 point of sale locations at one time. At retail locations 600 having more than 8 point of sale locations, the server 625 may assign more than one channel or more than one application to communicate with point of sale locations 650*a-n*. For example, the computing device 625 may assign pumps 1-8 to the application 626 via a first channel and assign pumps 8-16 to the application 626 via a second channel. In other embodiments, the computing device 625 may assign a second application to pumps 8-16. During a transaction, application 626 may transmit a request to the server 620 every 3 seconds for the transaction status.

In some embodiments, a second application 627 may be an application executing on the server 640. In some embodiments, the application 627 may be responsible for transaction processing. Application 627 may be responsible for handling data related to pre-authorization transactions, post-authorization transactions, and any details related to the transaction. In some embodiments, the application 627 may be communicatively coupled with the point of sale server 640 and the remote server 630.

In some embodiments, the application 627 receives loyalty program information from point of sale server 640 for a transaction. The application 627 may transmit the loyalty program information and/or retail location information to the remote server 630 for transaction processing. In some embodiments, the remote server 630 processes the transaction and transmits an acknowledgement to the application 627 indicating that the loyalty program information and/or retail location information was received.

In some embodiments, a third application may be an application executing on the server 625. In some embodiments, the application 628 may be responsible for processing loyalty information related to a transaction. The application 628 may be communicatively coupled with the point of sale server 640 and the remote server 630. In an embodiment, application 628 is a middleware between the point of sale server 640 and the remote server 630.

In some embodiments, during a transaction, the point of sale server 640 transmits a loyalty request to the remote server 630 via the application 628. The application 628 may receive the loyalty request from the point of sale server 640 and forward the request to the remote server 630. The remote server 630 determines if the retail location 600 associated with the transaction has a loyalty program. If the remote server 630 determines that the retail location 600 does have a loyalty program, the remote server 630 will transmit a response to the application 628 indicating that the loyalty request has been received and processed.

In some embodiments, the server 625 adheres all communications in the payment system to be encrypted. In addition to the encryptions, the server 625 may apply strict firewall rules. The firewall rules may include blocking all the ports associated with the electronic payment system from outside sources and make the system hard to penetrate. In some embodiments, the system may scan for open ports that can affect the network by viruses. In some embodiments, the server 625 receives antivirus updates on a regular basis, for example an hourly basis, which keeps the network secure.

The back office servers 610 may communicate with the point of sale server 640. The point of sale sever 640 may be a server or computing device of a retail location 600. In some embodiments, the point of sale server 640 is a personal computer of the retail location 600. In some embodiments, the point of sale server 640 may be a single server, a plurality of servers, a server farm, or an allocation of computing services provided by a cloud based provider of computer services. In some embodiments, the point of sale server 640 may be a plurality of servers operated by a plurality of different parties, entities, and service providers. The point of sale server 640 may be located at the retail location 600 or at a remote location from the retail location 600.

In some embodiments, the point of sale server 640 may be in communication with point of sale locations 650*a-n* at a retail location 600. In some embodiments, the point of sale server 640 is in communication with the point of sale locations 650*a-n* via a wireless connection. In some embodiments, communications between the point of sale server 640 and the point of sale locations 650*a-n* occur across a network. The network can be a WAN, LAN, or any other embodiment of a network such as those described above. In some embodiments, communications between the point of sale server 640 and the point of sale locations 650*a-n* occur across the public Internet. In some embodiments, communications between the point of sale server 640 and the point of sale locations 650*a-n* occur across a virtual private network (VPN). In some embodiments, communication between the point of sale server 640 and the point of sale locations 650*a-n* occur across any form of wide area network. In some embodiments, communications between the point of sale server 640 and the point of sale locations 650*a-n* occur across a private network.

In some embodiments, communications between the point of sale server 640 and the point of sale locations 650*a-n* are encrypted using shared secret key encryption. In some embodiments, communications between the point of sale server 640 and the point of sale locations 650*a-n* are encrypted using Secure Socket Layer (SSL) or Transport Layer Security (TLS) protocols. In some embodiments, communications between the point of sale server 640 and the point of sale locations 650*a-n* are encrypted using a proprietary encryption scheme.

In some embodiments, the system further includes an antenna 660. In some embodiments, the system includes a set of antennas 660. The antenna 660 may be a device used to transmit and/or receive radio, television, microwave, and satellite signals. In some embodiments, the antenna 660 may be an electrical device that converts radio-frequency (RF) fields into alternating current (AC) and/or and vice versa. In some embodiments, the antenna 660 may be used with a radio transmitter or a radio receiver. In some embodiments, the antenna 660 may be used in computer and/or internet wireless applications.

Figure 7A:
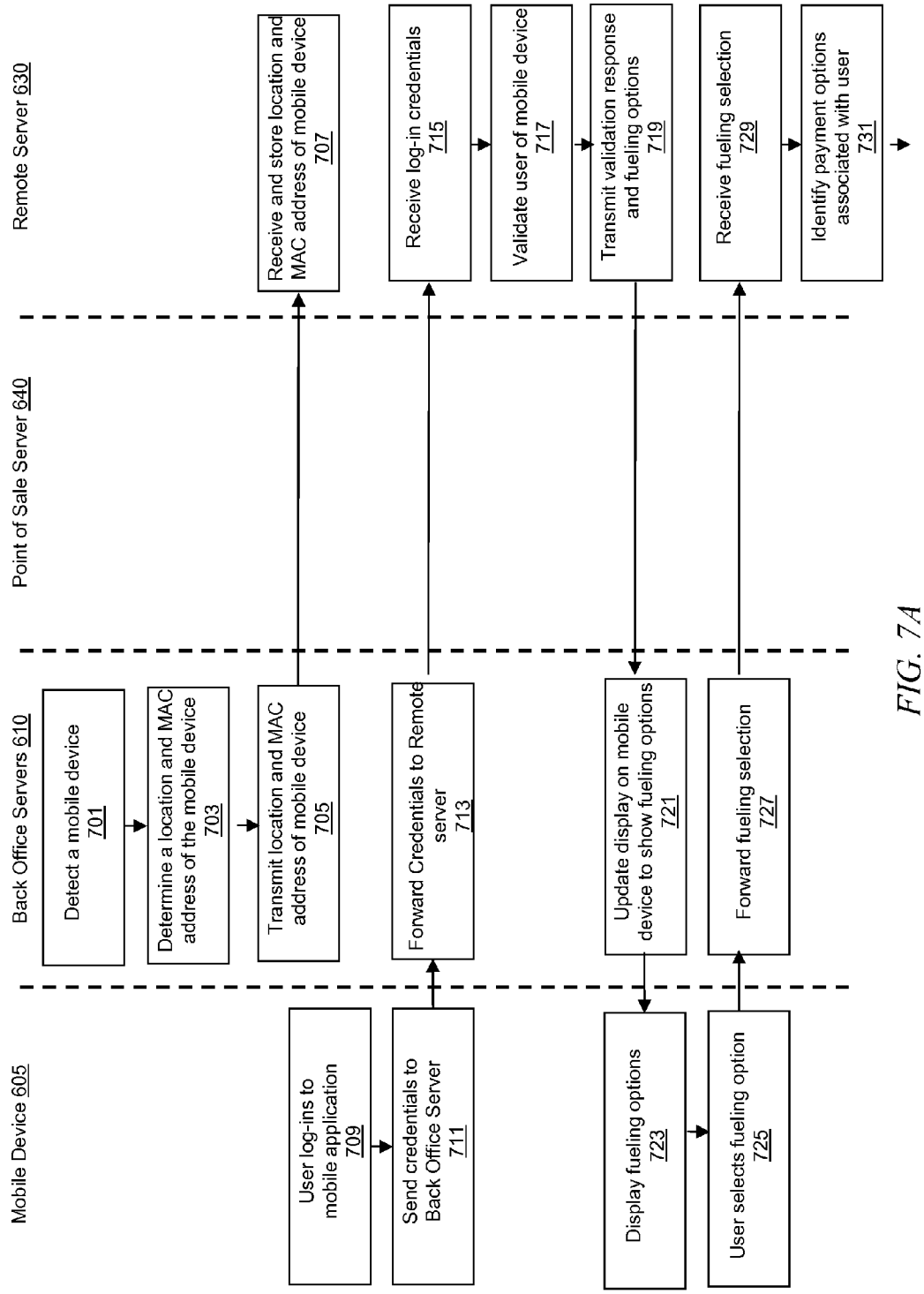
FIGS. 7A-C are flow diagrams of a method for processing electronic payments.
Figure 7B:
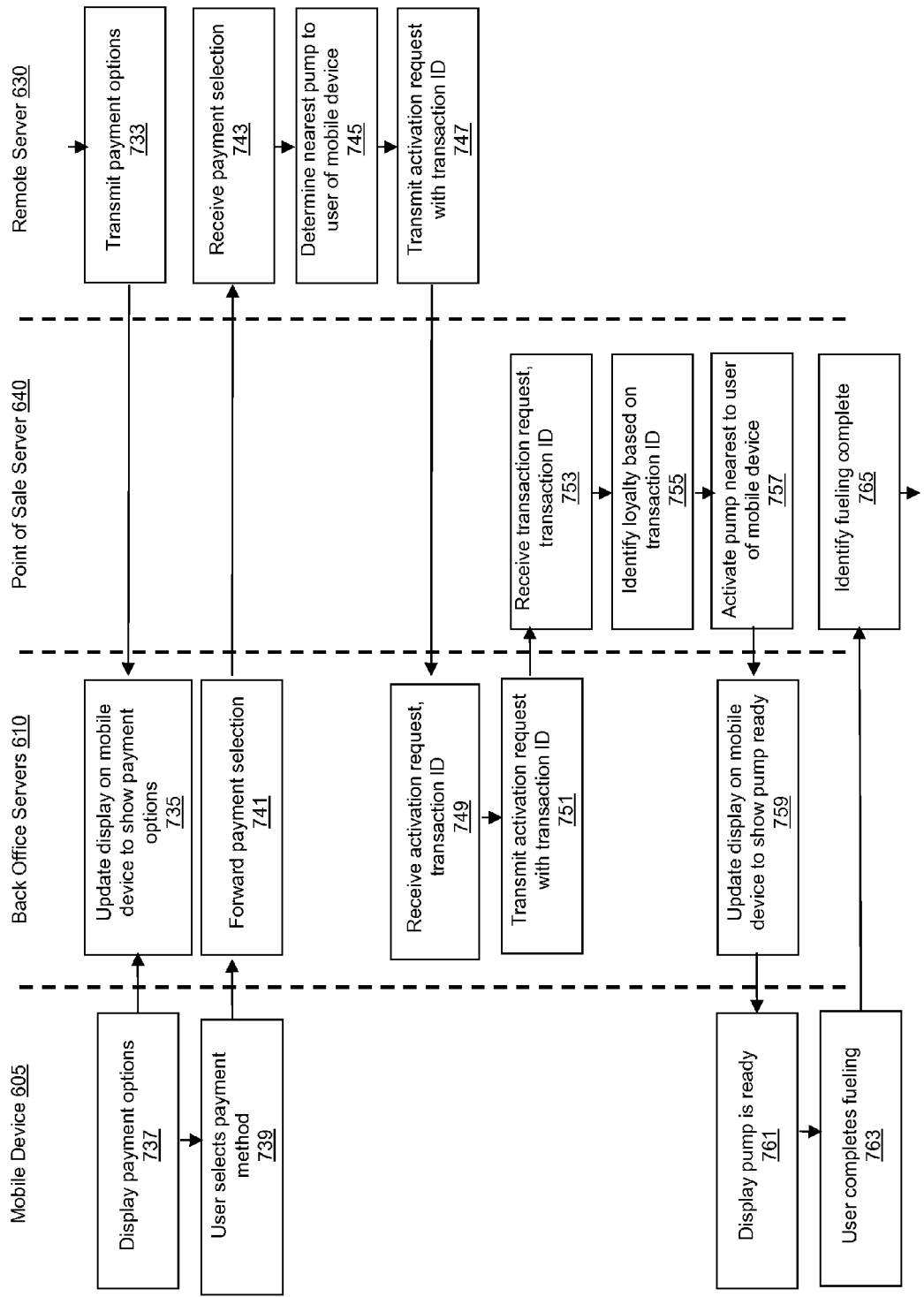
Figure 7C:
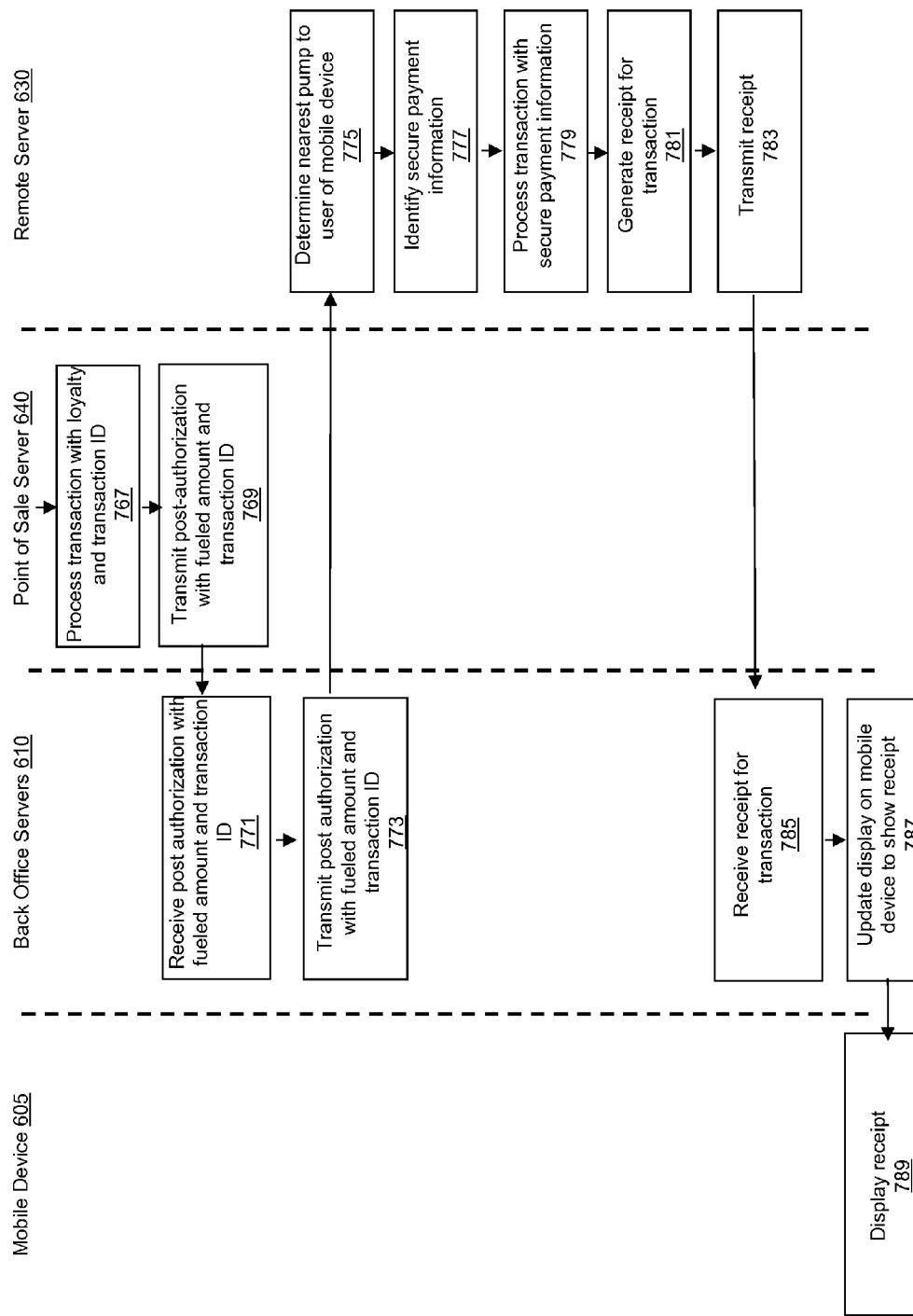
Figure 8A:
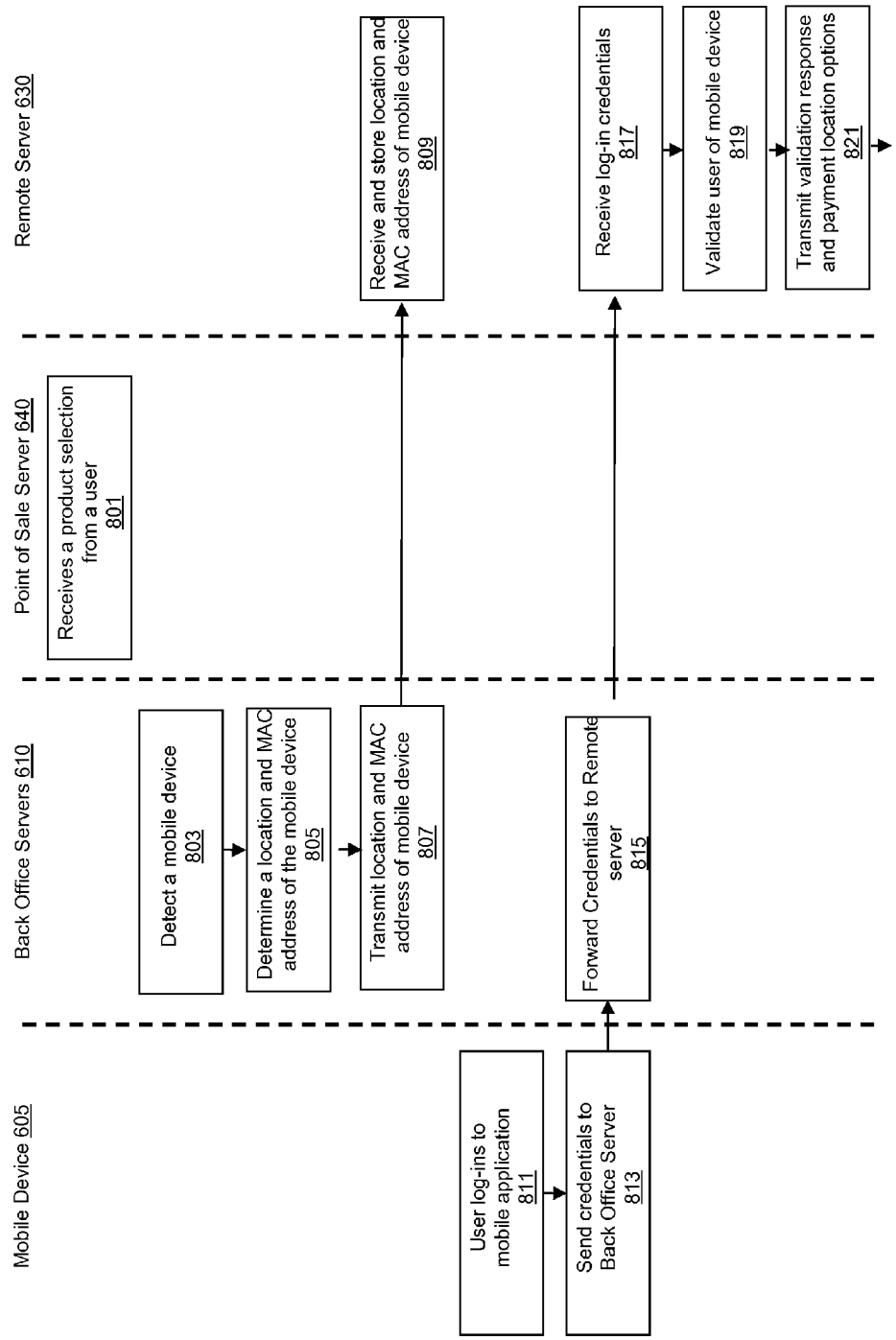
FIGS. 8A-D are flow diagrams of a method for processing electronic payments.
Figure 8B:
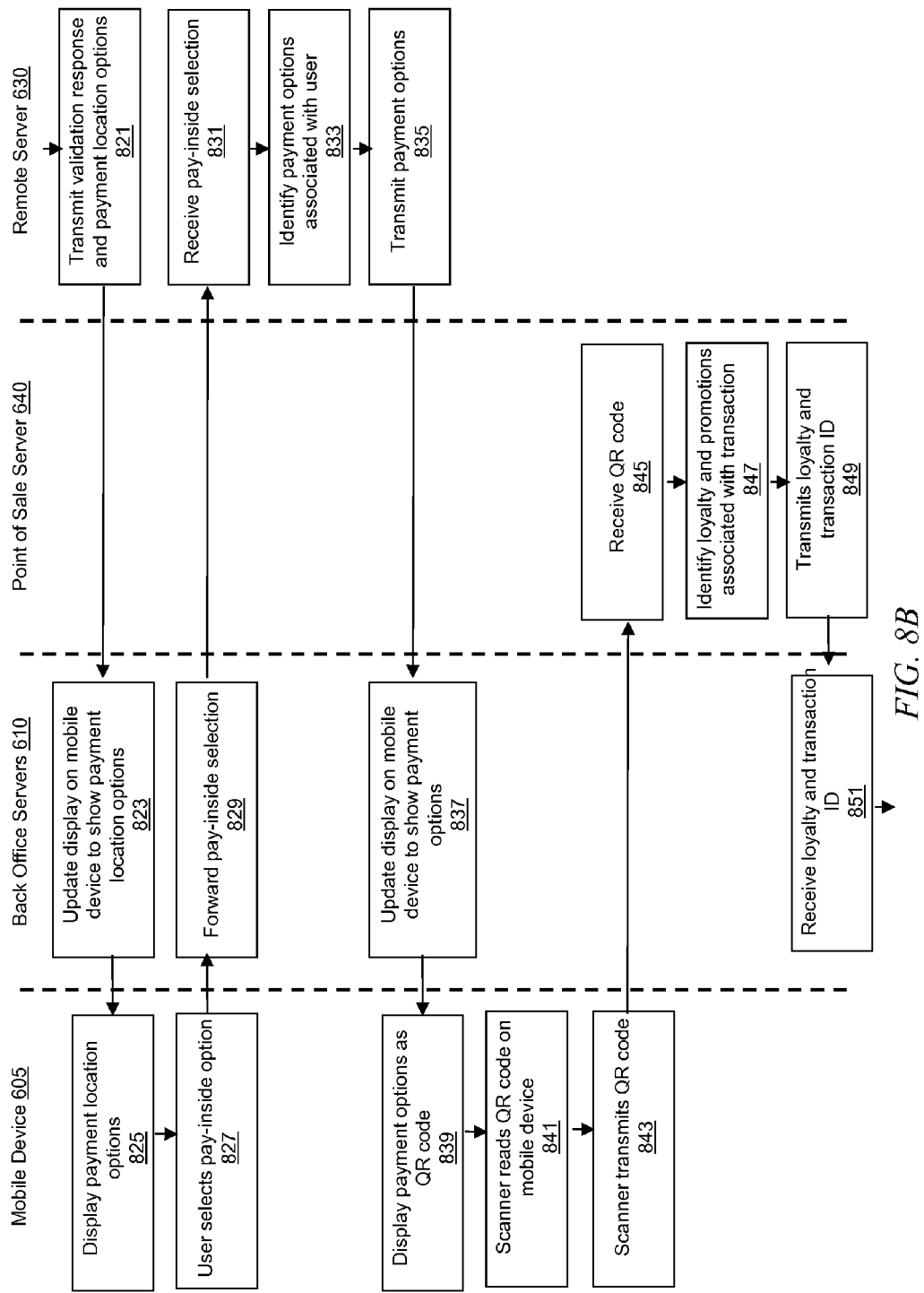
Figure 8C:
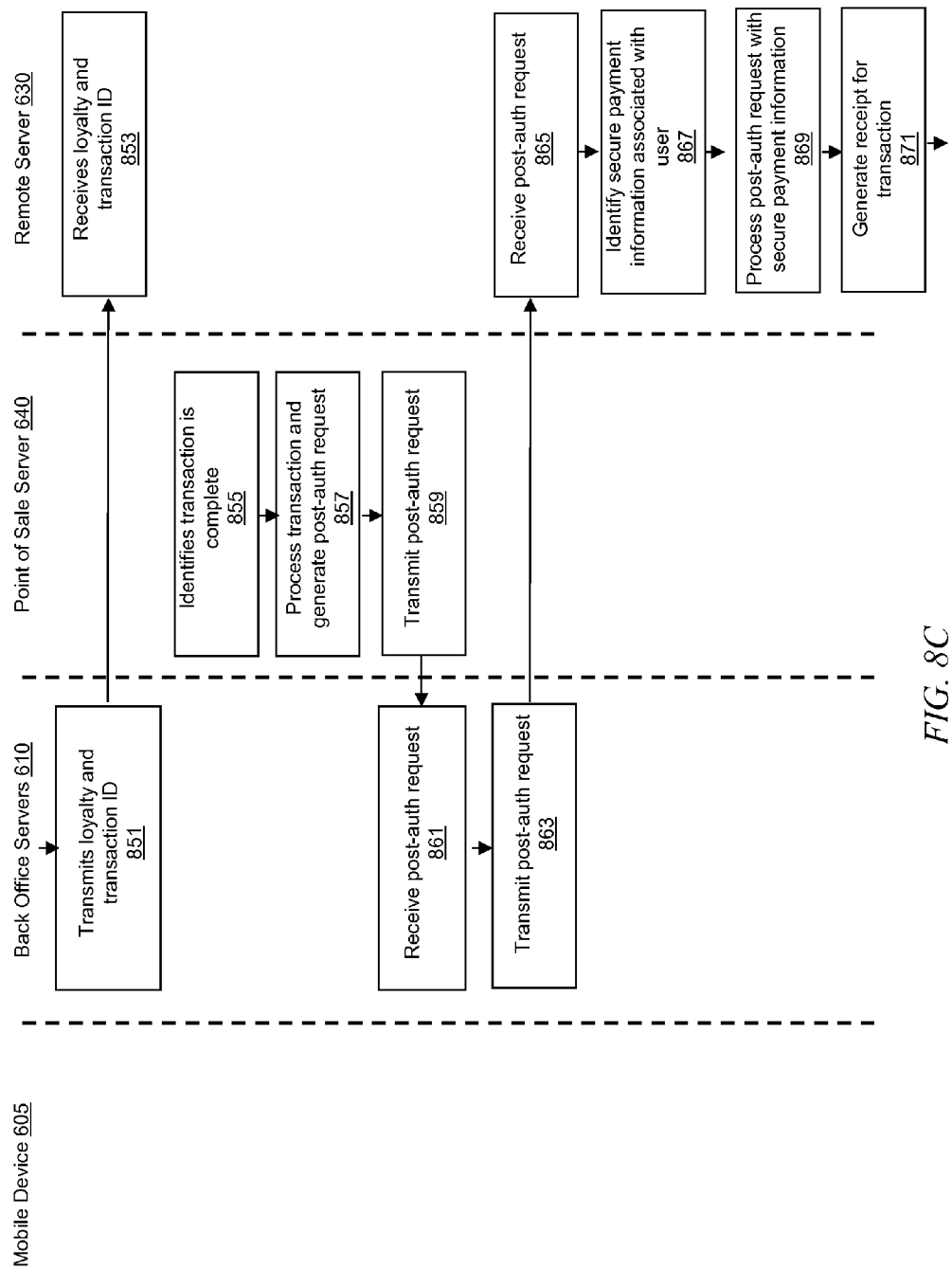
Figure 8D:
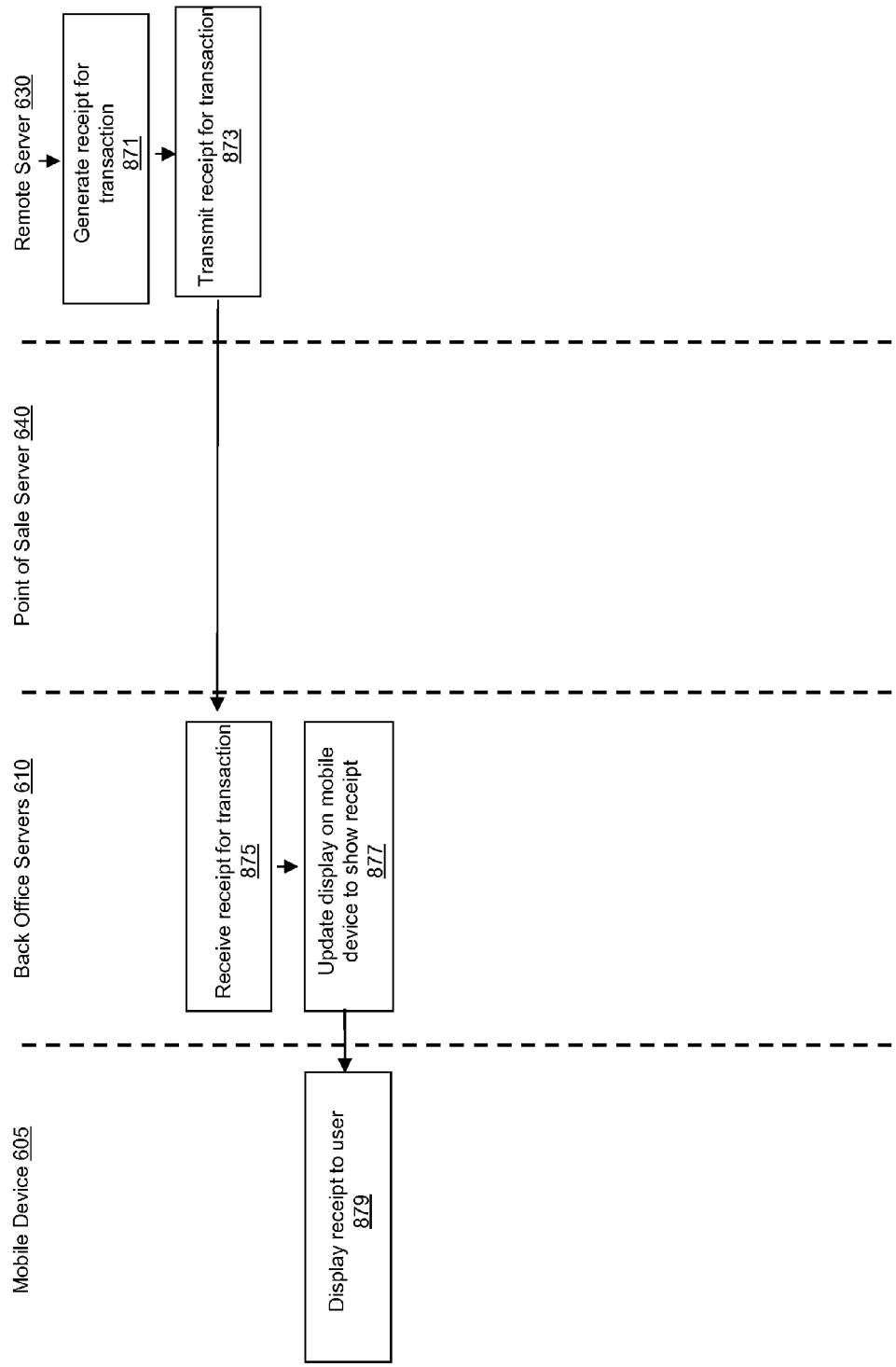

In reference now to FIGS. 7A-C, a flow diagram for processing an electronic payment at a retail location 600 is shown. A set of antennas 660 detect 701 a mobile device 605 within a range of the antennas. The antennas determine 703 the location of the mobile device 605 and a media access control (MAC) address of the mobile device 605. The antennas transmit 705 the location and MAC address of the mobile device 605 to a remote server 630. The remote server 630 stores 707 the MAC address and location information associated with the mobile device 605. The set of antennas may continually transmit MAC addresses and location information of mobile devices as the mobile devices are detected. The remote server 630 may maintain a database including the MAC addresses and location information associated with the detected mobile devices 605. The remote server 630 may continually update the database as new information is received.

A mobile application executing on a mobile device 605 receives a request 709 to log-in to the mobile application. The log-in request, including credentials associated with the user, is sent 711 to back office servers 610. The back office servers 610 forward 713 to the credentials to a remote server 630 to validate the user. The remote server 630 receives 715 the credentials associated with the user of the mobile device 605. The remote server 630 validates 717 the user of the mobile device 605 based on the credentials and accepts the log-in request. The remote server 630 transmits 719 a validation response indicating the log-in request was successful and provides fueling options based on the location of the mobile device 605.

The back office servers 610 receive the validation response and fueling options and updates 721 a user interface on the mobile device 605 to display the fueling options. The mobile application executing on the mobile device 605 displays 723 the fueling options to the user. The mobile application receives 725 a fueling selection from the user and sends it to the back office servers 610. The back office servers 610 forward 727 the fueling selection to the remote server 630. The remote server 630 receives 729 the fueling selection. The remote server 630 identifies 731 payment options associated with the user. The remote server 630 transmits 733 the payment options associated with the user to the back office servers 610. The back office servers 610 receive the payment options and updates 735 the user interface on the mobile device 605. The mobile device 605 displays 737 the payment options to the user. The mobile device receives 739 the payment option selection from the user and sends it to the back office servers 610. The back office servers 610 transmit 741 the payment selection to the remote server 630. The remote server 630 receives 743 the payment selection.

The remote server 630 determines 745 the nearest point of sale location 650 to the user based on the location of the mobile device 605. The remote servers 630 transmit 747 an activation request for the nearest point of sale location 650 and a transaction ID corresponding to the transaction to the back office servers 610. The back office servers 610 receive 749 the activation request and transaction ID. The back office servers 610 transmit 751 the activation request and the transaction ID to a point of sale server 640. The point of sale server 640 receives 753 the transaction request ID and the transaction ID. The point of sale server 640 identifies 755 loyalty information and promotions associated with the transaction and applies them to the transaction ID. The point of sale server 640 activates 757 the pump identified in the activation request, updates a user interface on the pump to indicate the pump is ready for fueling, and transmits the transaction ID to the back office servers 610. The back office servers 610 update 759 the user interface on the mobile device 605. The mobile device 605 display 761 indicates the pump the user is standing nearest to is ready for fueling. The mobile device 605 identifies 763 the fueling process is complete. The point of sale server 640 identifies 765 the fueling process is complete. The point of sale server 640 processes 767 the transaction and generates a post-authorization request with the loyalty information, fueled amount, discount amount, final transaction amount, and transaction ID.

The point of sale server 640 transmits 769 the post-authorization request to the back office servers 610. The back office servers 610 receive 771 the post-authorization request. The back office servers 610 transmit 773 the post-authorization request to the remote server 630. The remote server 630 receives 775 the post-authorization request. The remote server 630 identifies 777 secure payment information associated with the user using the transaction ID. The remote server 630 processes 779 processes the transaction (post-authorization request) with secure payment information. The remote server 630 generates 781 a receipt for the completed transaction. The remote server 630 transmits 783 the receipt to the back office servers 610. The back office servers 610 receive 785 the receipt for the transaction. The back office servers 610 update 787 the user interface of the mobile device 605 to display the receipt. The mobile device 605 displays 789 displays the receipt to the user.

In reference now to FIGS. 8A-D, a flow diagram for processing an electronic payment in a retail location 600 is shown. A point of sale server 640 receives 801 a product selection from a user of a mobile device 605 from an available product list on a point of sale location 650. A set of antennas 660 detect 803 the mobile device 605 within a range of the antennas. The antennas 660 determine 805 the location of the mobile device 605. The antennas 660 transmit 807 the location and MAC address of the mobile device 605 to a remote server 630. The remote server 630 stores 809 the MAC address and location information associated with the mobile device 605. The set of antennas 660 may continually transmit MAC addresses and location information of mobile devices as the mobile devices are detected. The remote server 630 may maintain a database including the MAC addresses and location information associated with the detected mobile devices 605. The remote server 630 may continually update the database as new information is received.

A mobile application executing on a mobile device 605 receives a request 811 to log-in to the mobile application. The log-in request, including credentials associated with the user, is sent 813 to a back office servers 610. The back office servers 610 forward 815 the credentials to a remote server 630 to validate the user. The remote server 630 receives 817 the credentials associated with the user of the mobile device 605. The remote server 630 validates 819 the user of the mobile device 605 based on the credentials and accepts the log-in request. The remote server 630 transmits 821 a validation response indicating the log-in request was successful and provides payment location options, including pay-inside option, based on the location of the mobile device 605.

The back office servers 610 receive the validation response and payment location options and updates 823 a user interface on the mobile device 605 to display the payment location options. The mobile application executing on the mobile device 605 displays 825 the payment location options to the user. The mobile application receives 827 a pay inside selection from the user and sends it to the back office servers 610. The back office servers 610 forward 829 the pay inside selection to the remote server 630. The remote server 630 receives 831 the pay inside selection.

The remote server 630 identifies 833 payment options associated with the user. The remote server 630 transmits 835 the payment options associated with the user and a transaction ID to the back office servers 610. The back office servers 610 receive the payment options and transaction ID and updates 837 the user interface on the mobile device 605. The mobile device 605 displays 839 the payment options as quick response (QR) codes to the user.

A scanner 660 reads 841 a QR code corresponding to a payment method displayed on the mobile device 605. The scanner 660 transmits 843 the QR code to the point of sale server 640. The point of sale server 640 receives 845 receives the QR code. The point of sale server 640 identifies 847 loyalty information and promotions associated with the transaction. The point of sale server 940 transmits 849 the loyalty information and the transaction ID to the back office servers 610. The back office servers 610 transmit 851 the loyalty information and the transaction ID to the remote server 630. The remote server 630 receives 853 the loyalty information and the transaction ID.

The point of sale server 640 identifies 855 the transaction is complete. The point of sale server 640 processes 857 the transaction and generates a post-authorization request with the loyalty information, fueled amount, discount amount, final transaction amount, and transaction ID.

The point of sale server 640 transmits 859 the post-authorization request to the back office servers 610. The back office servers 610 receive 861 the post-authorization request. The back office servers 610 transmit 863 the post-authorization request to the remote server 630. The remote server 630 receives 865 the post-authorization request. The remote server 630 identifies 867 secure payment information associated with the user using the transaction ID. The remote server 630 processes 869 processes the transaction (post-authorization request) with secure payment information. The remote server 630 generates 871 a receipt for the completed transaction. The remote server 630 transmits 873 the receipt to the back office servers 610. The back office servers 610 receive 875 the receipt for the transaction. The back office servers 610 update 877 the user interface of the mobile device 605 to display the receipt. The mobile device 605 displays 879 displays the receipt to the user.

Figure 9:
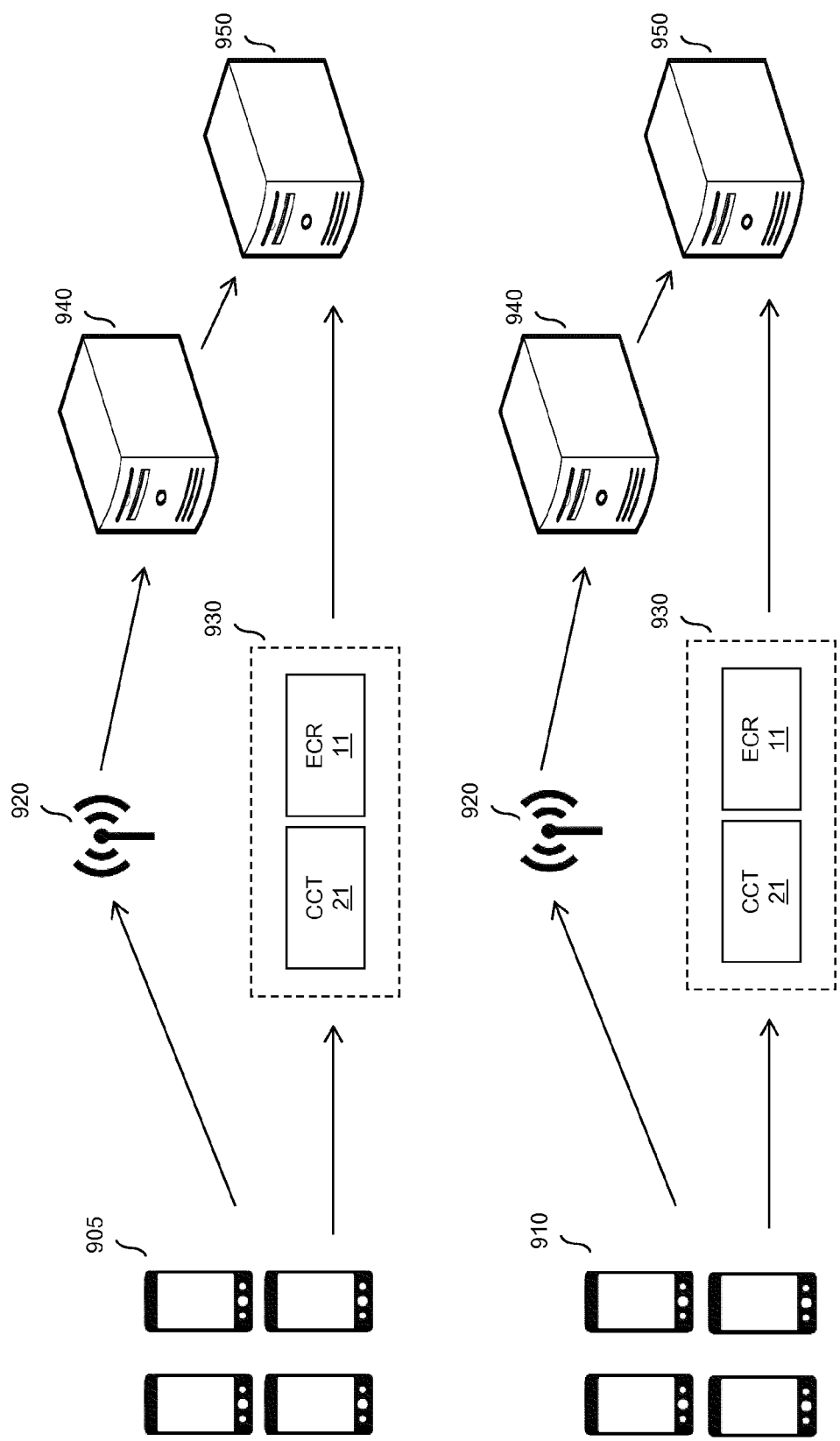
FIG. 9 is a block diagram of a system for processing electronic payments.

In reference now to FIG. 9, a system for processing an electronic payment at a retail location 600 is shown. An antenna 920 may detect a signal from at least one of a plurality of mobile devices 905. In some embodiments, the antenna 920 detects a signal from each of the plurality of mobile devices 905. In some embodiments, the antenna 920 detects a signal from a first set of mobile devices 905. The antenna 920 may determine a first set of MAC addresses for the first set of mobile devices 905. In some embodiments, the antenna 920 detects a signal from a second set of mobile devices 910. The antenna 920 may determine a second set of MAC addresses for the second set of mobile devices 910.

In some embodiments, the antenna 920 may be a device used to transmit and/or receive radio, television, microwave, and satellite signals. In some embodiments, the antenna 920 may be an electrical device that converts radio-frequency (RF) fields into alternating current (AC) and/or vice versa. In some embodiments, the antenna 920 may be used with a radio transmitter or a radio receiver. In some embodiments, the antenna 920 may be used in computer and/or internet wireless applications.

In some embodiments, the antenna 920 is a Motorola antenna. In some embodiments, the antenna works on advanced tag-based location solution (ATLS) which uses Bluetooth low energy (BLE) technology which allows a Bluetooth 4.0 device to be precisely located. In some embodiments, when mobile devices 905, 910 are within a range of the antenna 920, the antenna 920 may recognize a wireless beacon from a tag associated with at least one mobile device 905, 910 using Bluetooth radio. The antenna 920 may transmit the data to a locator server 940 and/or a remote server 950 using Rest/JSON API over HTTPS protocol. In some embodiments, HTTPS is a secure sockets layer protocol.

The antenna 920 may be in communication with a locator server 940 and a remote server 950. In some embodiments, the antenna 920 is in communication with the server 940 and the remote server 950 via a wireless connection. In some embodiments, communications between the antenna 920 and each server 940, 950 can occur across a network. The network can be a WAN, LAN, or any other embodiment of a network. In some embodiments, communications between the antenna 920 and each of the servers 940, 950 can occur across the public Internet. In some embodiments, communications between the antenna 920 and each of the servers 940, 950 can occur across a virtual private network (VPN). In some embodiments, communication between the antenna 920 and each of the servers 940, 950 can occur across any form of wide area network. In some embodiments, communications between the antenna 920 and each of the servers 940, 950 can occur across a private network.

In some embodiments, communications between the antenna 920 and each of the servers 940, 950 is encrypted using shared secret key encryption. In some embodiments, communications between the antenna 920 and each of the servers 940, 950 is encrypted using Secure Socket Layer (SSL) or Transport Layer Security (TLS) protocols. In some embodiments, communications between the antenna 920 and each of the servers 940, 950 is encrypted using a proprietary encryption scheme.

The locator server 940 may be a single server, a plurality of servers, a server farm, or an allocation of computing services provided by a cloud based provider of computer services. In some embodiments, locator server 940 may be a plurality of servers operated by a plurality of different parties, entities, and service providers. The locator server 940 may be located at the retail location 600 or at a remote location. In some embodiments, the locator server 940 may be a component of a central server and/or remote server, similar to remote server 630 described above with respect to FIG. 6B. In some embodiments, the locator server 940 may be a component of a back office server, similar to the back office servers 610 described above with respect to FIG. 6B.

The remote server 950 may be a single server, a plurality of servers, a server farm, or an allocation of computing services provided by a cloud based provider of computer services. In some embodiments, remote server 950 may be a plurality of servers operated by a plurality of different parties, entities, and service providers. The remote server 950 may be located at the retail location 600 or at a remote location. In some embodiments, the remote server 950 may be a component of a central server and/or remote server, similar to remote server 630 described above with respect to FIG. 6B.

The antenna 920 may be in communication with a point of sale location 930. In some embodiments, the point of sale server 930 is a point of sale location at a retail location 600. In some embodiments, the point of sale location 930 may include a credit card terminal (CCT) 21 and/or an electronic cash register (ECR) 11, similar to those described above with respect to FIGS. 3 and 4. In some embodiments, the antenna 920 is in communication with the point of sale server 930 via a wireless connection. In some embodiments, communications between the antenna 920 and the point of sale server 930 can occur across a network. The network can be a WAN, LAN, or any other embodiment of a network. In some embodiments, communications between the antenna 920 and the point of sale server 930 can occur across the public Internet. In some embodiments, communications between the antenna 920 and the point of sale server 930 can occur across a virtual private network (VPN). In some embodiments, communication between the antenna 920 and the point of sale server 930 can occur across any form of wide area network. In some embodiments, communications between the antenna 920 and the point of sale server 930 can occur across a private network.

In some embodiments, communications between the antenna 920 and the point of sale server 930 is encrypted using shared secret key encryption. In some embodiments, communications between the antenna 920 and the point of sale server 930 is encrypted using Secure Socket Layer (SSL) or Transport Layer Security (TLS) protocols. In some embodiments, communications between the antenna 920 and the point of sale server 930 is encrypted using a proprietary encryption scheme.

Figure 10A:
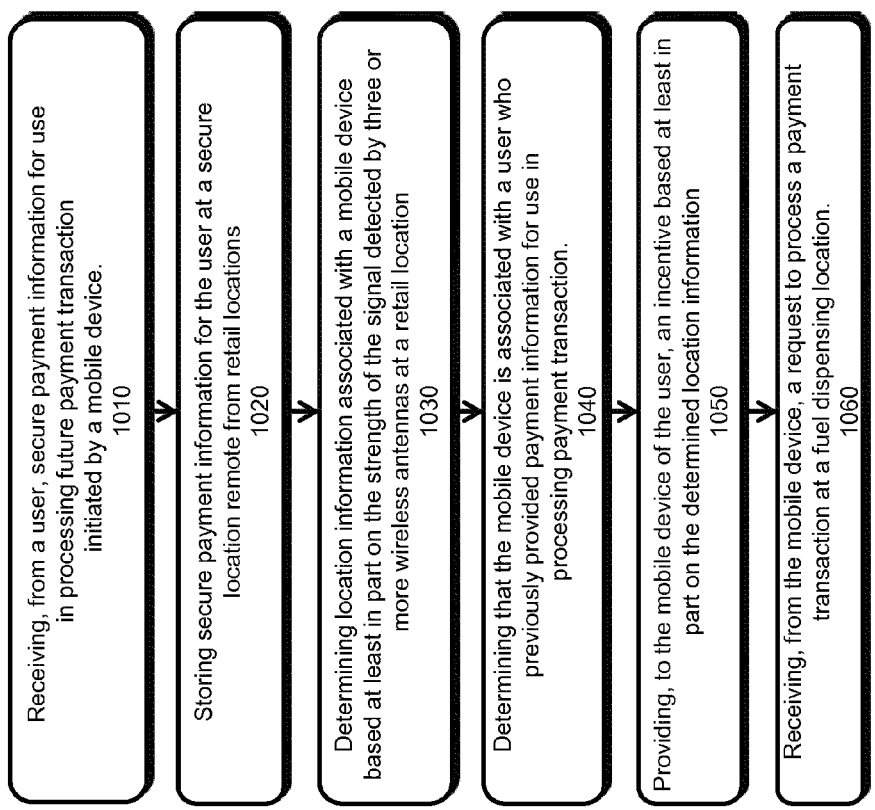
FIGS. 10A-B are flow diagrams of a method for processing electronic payments.
Figure 10B:
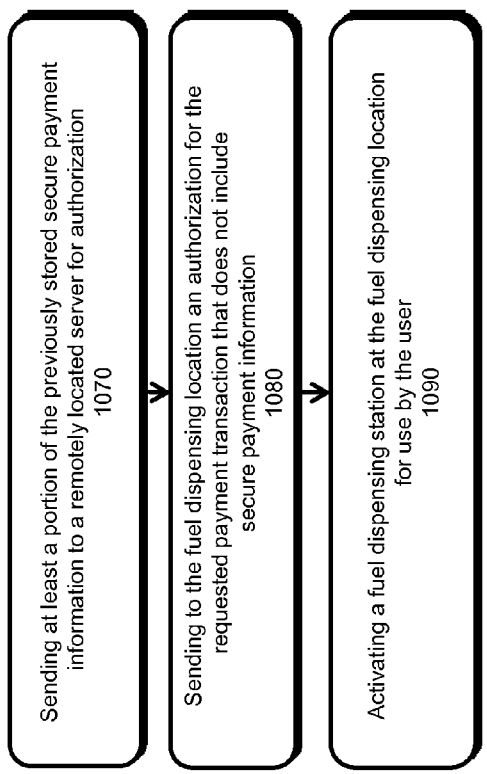

In reference now to FIGS. 10A-B, a flow diagram of a method for processing an electronic payment is shown. In a brief overview, the method includes receiving, from a user, secure payment information for use in processing future payment transactions initiated by a mobile device (1010); storing secure payment information for the user at a secure location remote from retail locations (1020); determining location information associated with a mobile device based at least in part on the strength of the signal detected by three or more wireless antennas at a retail location (1030); determining that the mobile device is associated with a user who previously provided payment information for use in processing payment transactions (1040); providing, to the mobile device of the user, an incentive based at least in part on the determined location information (1050); receiving, from the mobile device, a request to process a payment transaction at a fuel dispensing location (1060); sending at least a portion of the previously stored secure payment information to a remotely located server for authorization (1070); sending to the fuel dispensing location an authorization for the requested payment transaction that does not include secure payment information (1080); and activating a fuel dispensing station at the fuel dispensing location for use by the user (1090).

A remote server receives 1010, from a user, secure payment information for use in processing future payment transactions. In some embodiments, the user (e.g., client, customer) can register and create an account for a mobile application. In some embodiments, the mobile application is a virtual payment system to store payment information on a remote server. The user may create a virtual wallet (e.g., mobile wallet) for use in future transactions. During the registration process, the user can enter payment information to be used to complete and process future transactions. In some embodiments, the payment information may include secure payment information for example and without limitation, credit card information, debit card information, gift card information, and/or any other card or payment information that is supported in the payment industry. The remote server may generate identifications codes for each of the payment methods entered by the user. In some embodiments, the identification codes may be referred to as a transaction ID. In some embodiments, the identification code may remain valid for the length of the transaction. In one embodiment, the identification codes may remain valid for 15 minutes. In other embodiments, the lifespan and/or time of validity of an identification code may be established for any desired time. In some embodiments, a payment transaction may be denied if the respective identification code is no longer valid and/or has expired. In some embodiments, an identification code may be any computer readable identifier for a customer, including a data packet, address in memory, message, file, hash, or database entry. In some embodiments, a transaction ID may be any computer readable identifier for a customer, including a data packet, address in memory, message, file, hash, or database entry.

In some embodiments, the secure payment information is stored 1020 for the user at a secure location remote from retail locations. The virtual wallet may be maintained in a customer record on a remote server that is remotely located from any retail store locations. In some embodiments, the virtual wallet is maintained in a cloud computing network. In some embodiments, the user can pay for products and goods at a retail location without using the secure payment information at the retail location. In some embodiments, during a payment transaction, a retail location never handles or processes the secure payment information.

In some embodiments, location information associated with a mobile device is determined 1030 based at least in part on the strength of the signal detected by three or more wireless antennas at a retail location. In some embodiments, a set of antennas is located at or near a retail location. In some embodiments, the set of antennas include 3 antennas. In other embodiments, the set of antennas includes any number of antennas. In one embodiment, the retail location may only have 1 antenna instead of a set of antennas.

In some embodiments, the antennas are arranged in a triangular shape in a retail location. In some embodiments, the antennas are arranged around a plurality of point of sale locations at the retail location. The set of antennas may detect a signal within a range from the retail location. In some embodiments, the set of antennas may detect a signal from a mobile device within a range of the retail location. In some embodiments, the range may be based on the property boundaries of the retail location. In some embodiments, the range may be based on the location of various points of sale locations at the retail location. In some embodiments, the range may be a distance around the retail location. In some embodiments, the set of antennas may detect a signal from more than one mobile device. The set of antennas may detect any number of mobile devices that are within the range of the set of antennas.

In some embodiments, the set of antennas may detect the location of the mobile device based on strength of signal of the mobile device and detect a media access control (MAC) address of the mobile device. The set of antennas may transmit the MAC address of the mobile device and the location of the mobile device to a server.

In some embodiments, a locator server receives the MAC address of the mobile device and the location of the mobile device. The locator server may identify a point of sale location in the closest proximity to the mobile device. The locator server may calculate a distance from the mobile device to the point of sale location closest to the mobile device. In some embodiments, the locator server may identify that a user of the mobile device is standing in front of or next to a point of sale location. For example, in one embodiment, the locator server may identify the user of the mobile device is in front of gas pump number 1 at the retail location.

In some embodiments, the locator server may identify a location of the user of the mobile device at the retail location. For example, in one embodiment, the locator server may identify that the user of the mobile device is in $2^{nd}$ aisle of a retail location. The locator server may transmit information associated with the mobile device to a central server. In some embodiments, the information associated with the mobile device may include: an identity of the nearest point of sale location, the MAC address of the mobile device, and/or a location at the retail location of the mobile device.

In some embodiments, a determination 1040 is made that the mobile device is associated with a user who previously provided payment information for use in processing payment transactions. In some embodiments, the central server receives information associated with mobile devices detected at a retail location. The central server may store the information associated with mobile devices in a database. The central server may search the database to identify a customer record associated with a user of at least one of the mobile devices.

In some embodiments, the central server may include a database of customer records. In some embodiments, a customer record corresponds to a virtual wallet created by a user. In some of the embodiments, each of the customer records corresponds to a previous transaction of a user (i.e., a user of a mobile device). The customer records may include secure payment information, purchase history, retail location information, loyalty program information, and/or MAC addresses of mobile devices identified at the time of a previous transaction.

In some embodiments, the central server may search the database using payment information. In some embodiments, the central server may search the database using characteristics of the mobile device, for example, a MAC address of the mobile device.

In some embodiments, if the central server does not identify a customer record in the database corresponding to the user of the mobile device, the central server may establish a new entry (e.g., customer record) in the database for the respective customer. The central server may link the MAC address of each mobile device detected at the time of a transaction request initiated by the user of the mobile device to the customer record.

In some embodiments, the central server identifies a customer record in the database corresponding to the user of the mobile device. In some embodiments, the central server determines the identity of the user of the mobile device based on the corresponding customer record.

The customer record may include MAC addresses of mobile devices detected during a previous transaction associated with the user. In some embodiments, the central server may compare the MAC addresses from the previous transactions to the addresses identified during the current transaction. The central server may identify MAC addresses present during previous transaction and the current transaction. In some embodiments, the central server may eliminate the MAC addresses from the customer record not present during the current transaction.

For example, in one embodiment, four mobile devices are detected by the antenna at the time of a first transaction request. The first transaction request is received from a user of at least one mobile device detected. The central server may link the MAC addresses of the four mobile devices detected at the time of the transaction to a customer record corresponding to the customer making the transaction request.

If the same customer visits the retail location again at a later time and uses the same payment method, the antenna may detect four mobile devices at the time of the second transaction request. The central server may compare the MAC addresses detected during the first transaction request, and stored in the customer record, to the MAC addresses detected during the second transaction request. In some embodiments, the central server will eliminate the MAC addresses form the customer record not present during both the first transaction request and the second transaction request.

In some embodiments, for subsequent transaction associated with the same customer, the central server may continue to compare MAC addresses detected during a subsequent transaction request to MAC addresses in the respective customer record until the customer record only contains one MAC address. The central server may permanently link the remaining one MAC address to the customer in the customer record.

In some embodiments, to determine that at least one mobile device is a mobile device of the user, a first set of MAC address of a first set of mobile devices is determined. In some embodiments, information relating to a first set of payment transactions at a retail location is associated with the first set of MAC addresses. In some embodiments, a second set of MAC addresses of a second set of mobile devices is determined. In some embodiments, information relating to a second set of payment transactions at a retail location is associated with the second set of MAC addresses. In some embodiments, a determination may be made that a particular MAC address is associated with the user from whom secure payment information was previously received.

In some embodiments, the determination is made by comparing information relating to the first set of payment transactions associated with the first set of MAC addresses with the previously stored information relating to the user in order to identify one or more payment transactions associated with the user. Then information relating to the second set of payment transactions associated with the second set of MAC addresses may be compared with the previously stored information relating to the user in order to identify one or more payment transactions associated with the user. A MAC may be identified that is in both the first and the second sets of MAC addresses and that is associated with the first set and the second set of payment transactions associated with the user.

In some embodiments, an incentive based at least in part on the determined location information is provided 1050 to the mobile device of the user. In some embodiments, the incentive is a coupon and/or a discount. In some embodiments, the incentive is a reminder that the user may use their mobile device to complete the payment utilizing secure payment information previously stored at a secured location remote from retail locations.

In some embodiments, a point of sale server may receive information associated with a detected mobile device, including the location of the mobile device. In some embodiments, the point of sale server may identify loyalty program information applicable for the user of the mobile device. In some embodiments, the point of sale server may identify loyalty program information applicable for a current transaction. The loyalty program information may include incentives, discounts, and/or promotions. In some embodiments, the loyalty program information is selected based on at least one of a customer record of the user and a current location of the user.

In some embodiments, the loyalty program information is displayed to a user via the respective mobile device during a transaction. In some embodiments, the loyalty program information is displayed the respective point of sale location via an electronic display during a transaction. The promotions may be generated for the identified user of the mobile device based at least in part on a current location of the user and/or a transaction history of the user. The transaction history may be obtained from a corresponding customer record for the user. In some embodiments, the promotions may be dependent upon a specific location of the user at the retail location. For example, in one embodiment, when the mobile device is identified in one section of a retail location, a first set of advertisements may be generated. In some embodiments, when the mobile device is detected in a second section of the retail location, a second set of advertisements may be generated.

In some embodiments, the point of sale server identifies loyalty program information applicable to the current transaction and forwards the loyalty program information to the server and/or remote server. In some embodiments, the loyalty program information is forwarded for pre-authorization of a transaction.

In some embodiments, the server may receive the loyalty program information and forward the loyalty program information to the remote server for pre-authorization. The remote server may apply the loyalty program information to the current transaction to complete the pre-authorization. In some embodiments, the remote server applies incentives to the current transaction to complete the pre-authorization. In some embodiments, the remote server may identify secure payment information associated with the user based at least on the customer record and/or a virtual wallet. In some embodiments, the remote server may identify secure payment information associated with the user using a transaction ID. In some embodiments, the remote server may convert the transaction ID into an actual credit card number stored in the customer record and/or the virtual wallet to complete the pre-authorization.

In some embodiments, a request 1060 to process a payment transaction at a fuel dispensing location is received. In some embodiments, a mobile application executing on a mobile device receives a request to log-in to the mobile application. The log-in request may include credentials associated with the user of the mobile device. The log-in request, including credentials associated with the user, may be sent to a back office server. In some embodiments, the back office server receives the log-in request and generates and/or retrieves credentials associated with the user from a database. In some embodiments, the credentials are received from the user via the mobile device. The back office server may forward the credentials to a remote server (central server) to validate the log-in request.

The remote server may validate the user of the mobile device based on the credentials. In some embodiments, to validate the user, the remote server may identify a customer record associated with the user based on the received credentials. The remote server may compare the credentials to data stored in the customer record and determine if the received credentials are valid. In response to validating the user, the remote server may transmit a response to the back office server indicating if the log-in request was successful or unsuccessful. In some embodiments, if the log-in was unsuccessful, the back office server may update a user interface of the mobile device to instruct the user the log-in was unsuccessful and to try again.

In some embodiments, if the log-in was successful, the remote server may transmit fueling options to the back office server. The back office server may update the display on the mobile device to display fueling options. In some embodiments, the fueling options may include a list of fuel dispensing stations within a range of a current location of the mobile device. The range may be a pre-determined distance the user enters into the mobile application, for example and without limitations, 10 miles. Any distance may be entered by the user and used for a range value by the mobile application. In some embodiments, the location may be a future location and not the current location of the mobile device. For example, the user may enter a future destination and attempt to locate fueling options on various points on the trip to plan out the trip. In some embodiments, the fueling options may include a list of gas pumps at a single fuel dispensing station. In some embodiments, the fueling options may include a list of selections at a single gas pump.

The user may select a fueling option listed on the mobile application on the mobile device. The mobile device may receive the fueling selection and transmit the selection to the back office server. The back office server may transmit the fueling selection to the remote server.

In some embodiments, responsive to receiving a fueling selection, the back office server may perform an application programming interface (API) call to the remote server over HTTPS protocol to request payment methods from the remote server. The API call may include an identification code (e.g., customer ID) corresponding to the user, retail location information, and/or the fueling selection.

In some embodiments, at least a portion of previously stored secure payment information may be sent 1070 to the remotely located server for authorization. The remote server may receive the API call and identify payment information associated with the user. The payment information may be stored in the respective customer record and/or virtual wallet for the user. In some embodiments, the payment information may include at least a portion of secure payment information previously entered by the user. The remote server may retrieve the secure payment information from in a remote database on a remotely located server. In some embodiments, the secure payment information is stored on a central server. The remote server may receive the secure payment information. In some embodiments, the remote server may generate a transaction ID corresponding to payment information and/or secure payment information.

The remote server may transmit the payment information, including payment options, to the back office server. In some embodiments, the payment information does not include secure payment information. The back office server may receive the payment information and update the screen on the mobile device to display payment options to the user.

The back office server may receive a payment option selection from the user via the mobile device. The back office server may transmit the payment option selection from the user to another server. In some embodiments, the server is a component of the back office server. In some embodiments, the server is a switch between the back office server and a control box. The server may store the payment option selection in a temporary database. In some embodiments, the payment option selection may be stored in the temporary database for the duration of the transaction. In some embodiments, the payment option selection may be deleted from the temporary database when the transaction is complete. In some embodiments, the server may manage the transaction status.

In some embodiments, after sending the payment option selection, the back office server may continuously send a transaction status request to the server. In some embodiments, the server sends the transaction status request to the server every 2 seconds. In some embodiments, during the transaction, the server may display the transaction status on the mobile device. In some embodiments, the server may display the transaction status on the mobile device with an advertisement. In some embodiments, the advertisement is based on the customer record associated with the user, for example, previous transaction history of the user.

In some embodiments, a control server may continuously send a request for a transaction ID to the server. In some embodiments, the control server may be a component of the back office server. In some embodiments, in response to receiving the payment option selection from the back office server, the server may transmit the transaction ID to the control server. In some embodiments, the server may transmit the transaction ID with transaction details including, the retail location and fueling selection, to the control server. The control server may transmit the transaction ID and the transaction details to a point of sale server.

In some embodiments, an authorization for the requested payment transaction that does not include secure payment information is sent 1080 to the fuel dispensing location. In response to receiving the transaction ID and transaction details, the point of sale server may identify loyalty program information applicable for the current transaction. The loyalty program information may include incentives applicable to the current transaction. If the point of sale server identifies loyalty program information applicable to the current transaction, the point of sale server may forward the loyalty program information to the control server for pre-authorization.

The control server may forward the loyalty program information to the remote server for pre-authorization. The remote server may apply the loyalty program information to the current transaction to complete the pre-authorization. In some embodiments, the remote server applies incentives to the current transaction to complete the pre-authorization. In some embodiments, the remote server may apply costs associated with the fueling selection to complete the pre-authorization. In some embodiments, the remote server may identify secure payment information associated with the user using transaction ID. In some embodiments, the remote server may convert the transaction ID into secure payment information associated with the user. For example, in one embodiment, the remote server may convert the transaction ID into a credit card number associated with the user to complete the pre-authorization.

In response to completing the pre-authorization, the remote server may transmit a transaction status update to the server to update the transaction status in the temporary database. The server may forward an updated transaction status to the back office server to update a display on the mobile device. In response to receiving the transaction status update, the back office server may update the display on the mobile device.

In some embodiments, the remote server may transmit the completed pre-authorized transaction to the control server with the transaction ID. The control server may transmit the completed pre-authorization transaction and the transaction ID to the point of sale server.

In some embodiments, the fuel dispensing station at the fuel dispensing location may be activated 1090 for use by the user. In response to receiving the completed pre-authorization, the point of sale server may activate the fueling pump associated with the transaction. A user interface on the fueling pump may display a prompt to the user indicating the fueling pump is ready and activated.

The point of sale server may monitor the fueling process and wait for notification that the fueling process is complete. The point of sale server may monitor when the fueling pump nozzle has been lifted from the gas pump holder. In some embodiments, the point of sale server may monitor when the trigger on the fueling pump is depressed. In some embodiments, when the fueling process is complete, the point of sale server may transmit a transaction post-authorization request to the control server. The transaction post-authorization may include the fueled amount and transaction ID.

The control server may transmit the transaction post-authorization request to the remote server. In some embodiments, the remote server identifies secure payment information associated with the user using the transaction ID. The remote server may process the transaction using the secure payment information. In some embodiments, the control server may apply incentives to the transaction based on the loyalty program information.

The remote server may transmit a transaction status update indicating the transaction post-authorization is complete to the server. The server may transmit the transaction status update indicating the transaction post-authorization is complete to the back office server. The back office server may update the user interface on the mobile device to indicate the transaction is complete The point of sale server may transmit data related to the transaction to the control server. The control server may transmit data related to the transaction to the remote server. The data related to the transaction may include transaction amount, discount amount (loyalty program, incentive), final amount of the transaction, and the transaction ID. The remote server may generate a receipt including the data related to the transaction. The remote server may transmit the receipt to the control server. The control server may transmit the receipt to the back office server. The back office server may update the user interface of the mobile device to display the receipt.

In some embodiments, all information associated with a payment transaction may be stored in a remote server. In some embodiments, a transaction history is maintained for a user of a mobile device in a customer record on the remote server. The remote server may identify, based on analytical from previous transactions associated with a user of a mobile device, the user's interests and needs. In some embodiments, based on identified interests of a user, the system can retrieve, generate, and or display appropriate coupons, offers, advertisements, and various loyalty program information to the user during a current and/or subsequent transaction.

In some embodiments, a proprietor of a retail location (e.g., store owner, manager, and employee) may be able to access a transaction history of a user of a mobile device or a plurality of users of a plurality of mobile devices. In some embodiments, the proprietor may be able to identify sections of a retail store that a user frequently visits. In some embodiments, the proprietor may be able to identify demographic data related to characteristics of customers for each section of a store. In some embodiments, the proprietor may be able to display appropriate promotions, offers, and advertisements in a respective section of the retail location based on the transaction history.

Figure 11:
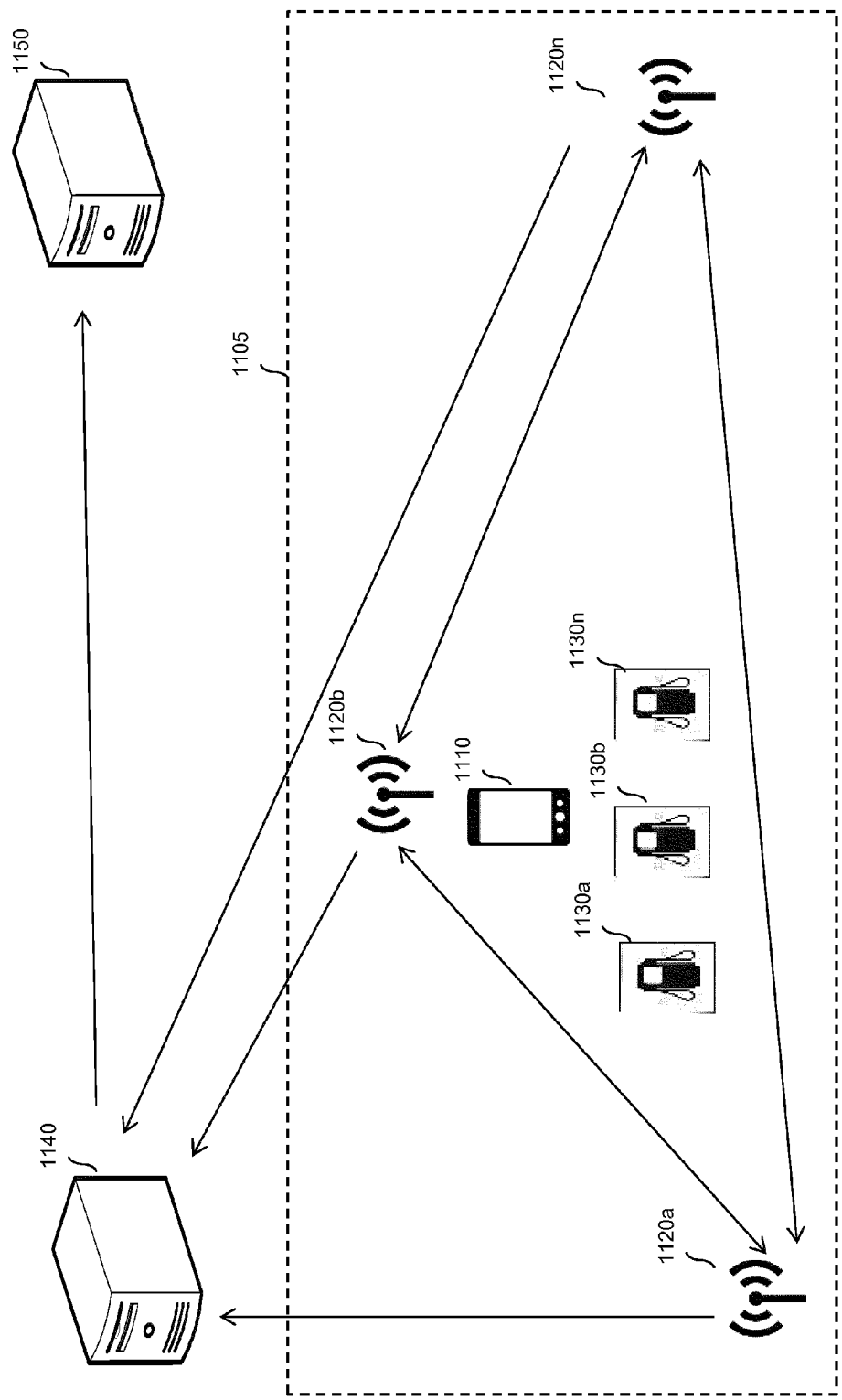
FIG. 11 is a block diagram of a system for processing electronic payments.

In reference now to FIG. 11, a system for processing electronic payments is shown. A retail location 1105 may include a set of antennas 1120a-n located at or near the retail location 1105. In some embodiments, the antennas 1120a-n are arranged in a triangular shape. In some embodiments, the antennas 1120a-n are arranged around a plurality of point of sale locations 1130a-n at the retail location 1105. The set of antennas 1120a-n can detect a signal within a range from the retail location 1105. In some embodiments, the set of antennas 1120a-n may detect a signal from at least one of a plurality of mobile devices 1110. In some embodiments, the set of antennas 1120 detect a signal from each of the plurality of mobile devices 1110. In some embodiments, the set of antennas 1120a-n detect a signal from a first set of mobile devices 905. The set of antennas 1120a-c may determine a first set of MAC addresses for the first set of mobile devices 1110. In some embodiments, the set of antennas 1120a-c detect a signal from a second set of mobile devices 1110. The set of antennas 1120a-c may determine a second set of MAC addresses for the second set of mobile devices 1110.

In some embodiments, each of the antennas 1120 may be a device used to transmit and/or receive radio, television, microwave, and satellite signals. In some embodiments, each of the antennas 1120 may be an electrical device that converts radio-frequency (RF) fields into alternating current (AC) and/or and vice versa. In some embodiments, each of the antennas 1120 may be used with a radio transmitter or a radio receiver. In some embodiments, each of the antennas 1120 may be used in computer and/or internet wireless applications.

In some embodiments, each of the antennas 1120 are a Motorola antenna. In some embodiments, each of the antennas 1120 works on advanced tag-based location solution (ATLS) which uses Bluetooth low energy (BLE) technology which allows a Bluetooth 4.0 device to be precisely located. In some embodiments, when at least one mobile device 1110 is within a range of at least one antenna 1120, the antenna 1120 may recognize a wireless beacon from a tag associated with the mobile device 1110 using Bluetooth radio. Each of the antennas 1120 may transmit the data to a locator server 1140 and/or a remote server 1150 using Rest/JSON API over HTTPS protocol. In some embodiments, HTTPS is a secure sockets layer protocol.

The each of the antennas 1120 may be in communication with a point of sale server. In some embodiments, the antennas 1120 are in communication with the point of sale server via a wireless connection. In some embodiments, communications between the antennas 1120 and point of sale server can occur across a network. The network can be a WAN, LAN, or any other embodiment of a network. In some embodiments, communications between the antennas 1120 and the point of sale server can occur across the public Internet. In some embodiments, communications between the antennas 1120 and the point of sale server can occur across a virtual private network (VPN). In some embodiments, communication between the antennas 1120 and the point of sale server can occur across any form of wide area network. In some embodiments, communications between the antennas 1120 and the point of sale server can occur across a private network.

In some embodiments, communications between the antennas 1120 and the point of sale server is encrypted using shared secret key encryption. In some embodiments, communications between the antennas 1120 and the point of sale server is encrypted using Secure Socket Layer (SSL) or Transport Layer Security (TLS) protocols. In some embodiments, communications between the antennas 1120 and point of sale server is encrypted using a proprietary encryption scheme.

In some embodiments, each of the antennas 1120 may be in communication with a locator server 1140 and a remote server 1150. In some embodiments, the antennas 1120 are in communication with the locator server 1140 and the remote server 1150 via a wireless connection. In some embodiments, communications between the antennas 1120 and each server 1140, 1150 can occur across a network. The network can be a WAN, LAN, or any other embodiment of a network. In some embodiments, communications between the antennas 1120 and each of the servers 1140, 1150 can occur across the public Internet. In some embodiments, communications between the antennas 1120 and each of the servers 1140, 1150 can occur across a virtual private network (VPN). In some embodiments, communication between the antennas 1120 and each of the servers 1140, 1150 can occur across any form of wide area network. In some embodiments, communications between the antennas 1120 and each of the servers 1140, 1150 can occur across a private network.

In some embodiments, communications between the antennas 1120 and each of the servers 1140, 1150 is encrypted using shared secret key encryption. In some embodiments, communications between the antennas 1120 and each of the servers 1140, 1150 is encrypted using Secure Socket Layer (SSL) or Transport Layer Security (TLS) protocols. In some embodiments, communications between the antennas 1120 and each of the servers 1140, 1150 is encrypted using a proprietary encryption scheme.

The locator server 1140 may be a single server, a plurality of servers, a server farm, or an allocation of computing services provided by a cloud based provider of computer services. In some embodiments, locator server 1140 may be a plurality of servers operated by a plurality of different parties, entities, and service providers. The locator server 1140 may be located at the retail location or at a remote location. In some embodiments, the locator server 1140 may be a component of a central server and/or remote server, similar to remote server 630 described above with respect to FIG. 6B. In some embodiments, the locator server 1140 may be a component of a back office server, similar to the back office servers 610 described above with respect to FIG. 6B.

The remote server 1150 may be a single server, a plurality of servers, a server farm, or an allocation of computing services provided by a cloud based provider of computer services. In some embodiments, remote server 1150 may be a plurality of servers operated by a plurality of different parties, entities, and service providers. The remote server 1150 may be located at the retail location or at a remote location. In some embodiments, the remote server 1150 may be a component of a central server and/or remote server, similar to remote server 630 described above with respect to FIG. 6B.

Figure 12A:
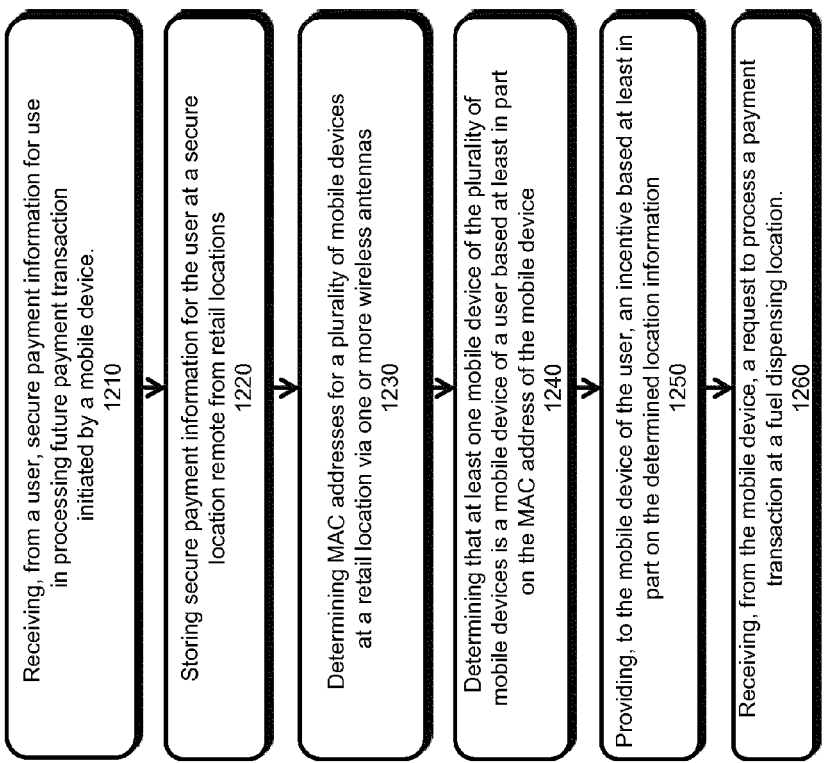
FIGS. 12A-B are flow diagrams of a method for processing electronic payments.
Figure 12B:
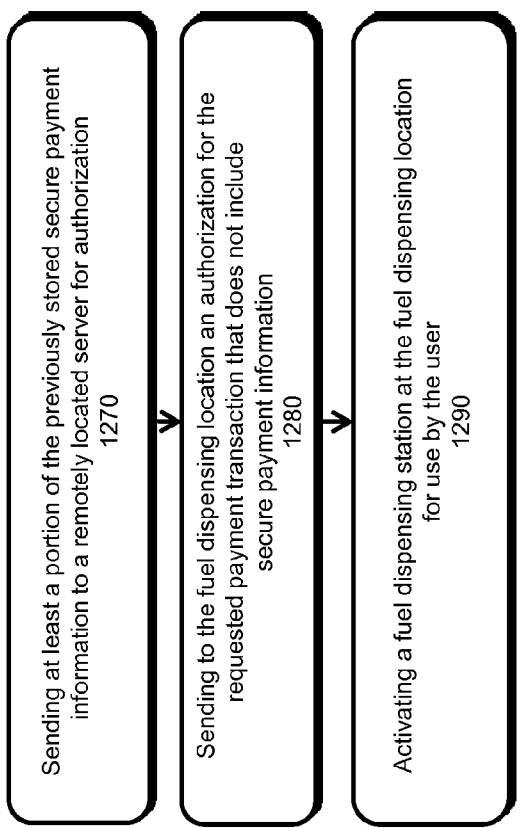

In reference now to FIGS. 12A-B, a method for processing an electronic payment at a retail location is shown. In a brief overview, the method includes receiving, from a user, secure payment information for use in processing future payment transactions initiated by a mobile device (1210); storing secure payment information for the user at a secure location remote from retail locations (1220); detecting MAC addresses for a plurality of mobile devices at a retail location via one or more wireless antennas (1230); determining that at least one mobile device of the plurality of mobile devices is a mobile device of a user based at least in part on the MAC address of the mobile device (1240); providing, to the mobile device of the user, an incentive based at least in part on the determined association between the one mobile device and the user (1250); receiving, from the mobile device, a request to process a payment transaction at a fuel dispensing location (1260); sending at least a portion of the previously stored secure payment information to a remotely located server for authorization (1270); sending to the fuel dispensing location an authorization for the requested payment transaction that does not include secure payment information (1280); and activating s fuel dispensing station at the fuel dispensing location for use by the user (1290).

A remote server receives 1210, from a user, secure payment information for use in processing future payment transactions. In some embodiments, the user (e.g., client, customer) can register and create an account for a mobile application. In some embodiments, the mobile application is a virtual payment system to store payment information on a remote server. The user may create a virtual wallet (e.g., mobile wallet) for use in future transactions. During the registration process, the user can enter payment information to be used to complete and process future transactions. In some embodiments, the payment information may include secure payment information for example and without limitation, credit card information, debit card information, gift card information, and/or any other card or payment information that is supported in the payment industry.

The remote server may generate identifications codes for each of the payment methods entered by the user. In some embodiments, the identification codes may be referred to as a transaction ID. In some embodiments, the identification code may remain valid for the length of the transaction. In one embodiment, the identification codes may remain valid for 15 minutes. In other embodiments, the lifespan and/or time of validity of an identification code may be established for any desired time. In some embodiments, a payment transaction may be denied if the respective identification code is no longer valid and/or has expired. In some embodiments, an identification code may be any computer readable identifier for a customer, including a data packet, address in memory, message, file, hash, or database entry. In some embodiments, a transaction ID may be any computer readable identifier for a customer, including a data packet, address in memory, message, file, hash, or database entry.

In some embodiments, the secure payment information is stored 1220 for the user at a secure location remote from retail locations. The virtual wallet may be maintained in a customer record on a remote server that is remotely located from any retail store locations. In some embodiments, the virtual wallet is maintained in a cloud computing network. In some embodiments, the user can pay for products and goods at a retail location without using the secure payment information at the retail location. In some embodiments, during a payment transaction, a retail location never handles or processes the secure payment information.

In some embodiments, MAC addresses for a plurality of mobile devices at a retail location may be detected 1230 via one or more wireless antennas. In some embodiments, information associated with a mobile device is determined based at least in part on the strength of the signal detected by three or more wireless antennas at a retail location. In some embodiments, a set of antennas is located at or near a retail location. In some embodiments, the set of antennas include 3 antennas. In other embodiments, the set of antennas includes any number of antennas. In one embodiment, the retail location may only have 1 antenna instead of a set of antennas.

In some embodiments, the antennas are arranged in a triangular shape in a retail location. In some embodiments, the antennas are arranged around a plurality of point of sale locations at the retail location. The set of antennas may detect a signal within a range from the retail location. In some embodiments, the set of antennas may detect a signal from a mobile device within a range of the retail location. In some embodiments, the range may be based on the property boundaries of the retail location. In some embodiments, the range may be based on the location of various points of sale locations at the retail location. In some embodiments, the range may be a distance around the retail location. In some embodiments, the set of antennas may detect a signal from more than one mobile device. The set of antennas may detect any number of mobile devices that are within the range of the set of antennas.

In some embodiments, the set of antennas may detect the location of the mobile device based on strength of signal of the mobile device and detect a media access control (MAC) address of the mobile device. The set of antennas may transmit the MAC address of the mobile device and the location of the mobile device to a server.

In some embodiments, a locator server receives the MAC address of the mobile device and the location of the mobile device. The locator server may identify a point of sale location in the closest proximity to the mobile device. The locator server may calculate a distance from the mobile device to the point of sale location closest to the mobile device. In some embodiments, the locator server may identify that a user of the mobile device is standing in front of or next to a point of sale location. For example, in one embodiment, the locator server may identify the user of the mobile device is in front of gas pump number 1 at the retail location.

In some embodiments, the locator server may identify a location of the user of the mobile device at the retail location. For example, in one embodiment, the locator server may identify that the user of the mobile device is in $2^{nd}$ aisle of a retail location. The locator server may transmit information associated with the mobile device to a central server. In some embodiments, the information associated with the mobile device may include: an identity of the nearest point of sale location, the MAC address of the mobile device, and/or a location at the retail location of the mobile device.

In some embodiments, a determination 1240 is made that at least one mobile device of the plurality of mobile devices is a mobile device of the user based at least in part on the MAC address of the mobile device. In some embodiments, a determination is made that the mobile device is associated with a user who previously provided payment information for use in processing payment transactions. In some embodiments, the central server receives information associated with mobile devices detected at a retail location. The central server may store the information associated with mobile devices in a database. The central server may search the database to identify a customer record associated with a user of at least one of the mobile devices.

In some embodiments, the central server may include a database of customer records. In some embodiments, a customer record corresponds to a virtual wallet created by a user. In some of the embodiments, each of the customer records corresponds to a previous transaction of a user (i.e., a user of a mobile device). The customer records may include secure payment information, purchase history, retail location information, loyalty program information, and/or MAC addresses of mobile devices identified at the time of a previous transaction.

In some embodiments, the central server may search the database using payment information. In some embodiments, the central server may search the database using characteristics of the mobile device, for example, a MAC address of the mobile device.

In some embodiments, if the central server does not identify a customer record in the database corresponding to the user of the mobile device, the central server may establish a new entry (e.g., customer record) in the database for the respective customer. The central server may link the MAC address of each mobile device detected at the time of a transaction request initiated by the user of the mobile device to the customer record.

In some embodiments, the central server identifies a customer record in the database corresponding to the user of the mobile device. In some embodiments, the central server determines the identity of the user of the mobile device based on the corresponding customer record.

The customer record may include MAC addresses of mobile devices detected during a previous transaction associated with the user. In some embodiments, the central server may compare the MAC addresses from the previous transactions to the addresses identified during the current transaction. The central server may identify MAC addresses present during previous transaction and the current transaction. In some embodiments, the central server may eliminate the MAC addresses from the customer record not present during the current transaction.

For example, in one embodiment, four mobile devices are detected by the antenna at the time of a first transaction request. The first transaction request is received from a user of at least one mobile device detected. The central server may link the MAC addresses of the four mobile devices detected at the time of the transaction to a customer record corresponding to the customer making the transaction request.

If the same customer visits the retail location again at a later time and uses the same payment method, the antenna may detect four mobile devices at the time of the second transaction request. The central server may compare the MAC addresses detected during the first transaction request, and stored in the customer record, to the MAC addresses detected during the second transaction request. In some embodiments, the central server will eliminate the MAC addresses form the customer record not present during both the first transaction request and the second transaction request.

In some embodiments, for subsequent transaction associated with the same customer, the central server may continue to compare MAC addresses detected during a subsequent transaction request to MAC addresses in the respective customer record until the customer record only contains one MAC address. The central server may permanently link the remaining one MAC address to the customer in the customer record.

In some embodiments, to determine that at least one mobile device is a mobile device of the user, a first set of MAC address of a first set of mobile devices is determined. In some embodiments, information relating to a first set of payment transactions at a retail location is associated with the first set of MAC addresses. In some embodiments, a second set of MAC addresses of a second set of mobile devices is determined. In some embodiments, information relating to a second set of payment transactions at a retail location is associated with the second set of MAC addresses. In some embodiments, a determination may be made that a particular MAC address is associated with the user from whom secure payment information was previously received.

In some embodiments, the determination is made by comparing information relating to the first set of payment transactions associated with the first set of MAC addresses with the previously stored information relating to the user in order to identify one or more payment transactions associated with the user. Then information relating to the second set of payment transactions associated with the second set of MAC addresses may be compared with the previously stored information relating to the user in order to identify one or more payment transactions associated with the user. A MAC may be identified that is in both the first and the second sets of MAC addresses and that is associated with the first set and the second set of payment transactions associated with the user.

In some embodiments, an incentive based at least in part on the determined location information is provided 1250 to the mobile device of the user. In some embodiments, the incentive is a coupon and/or a discount. In some embodiments, the incentive is a reminder that the user may use their mobile device to complete the payment utilizing secure payment information previously stored at a secured location remote from retail locations.

In some embodiments, a point of sale server may receive information associated with a detected mobile device, including the location of the mobile device. In some embodiments, the point of sale server may identify loyalty program information applicable for the user of the mobile device. In some embodiments, the point of sale server may identify loyalty program information applicable for a current transaction. The loyalty program information may include incentives, discounts, and/or promotions. In some embodiments, the loyalty program information is selected based on at least one of a customer record of the user and a current location of the user.

In some embodiments, the loyalty program information is displayed to a user via the respective mobile device during a transaction. In some embodiments, the loyalty program information is displayed the respective point of sale location via an electronic display during a transaction. The promotions may be generated for the identified user of the mobile device based at least in part on a current location of the user and/or a transaction history of the user. The transaction history may be obtained from a corresponding customer record for the user. In some embodiments, the promotions may be dependent upon a specific location of the user at the retail location. For example, in one embodiment, when the mobile device is identified in one section of a retail location, a first set of advertisements may be generated. In some embodiments, when the mobile device is detected in a second section of the retail location, a second set of advertisements may be generated.

In some embodiments, the point of sale server identifies loyalty program information applicable to the current transaction and forwards the loyalty program information to the server and/or remote server. In some embodiments, the loyalty program information is forwarded for pre-authorization of a transaction.

In some embodiments, the server may receive the loyalty program information and forward the loyalty program information to the remote server for pre-authorization. The remote server may apply the loyalty program information to the current transaction to complete the pre-authorization. In some embodiments, the remote server applies incentives to the current transaction to complete the pre-authorization. In some embodiments, the remote server may identify secure payment information associated with the user based at least on the customer record and/or a virtual wallet. In some embodiments, the remote server may identify secure payment information associated with the user using a transaction ID. In some embodiments, the remote server may convert the transaction ID into an actual credit card number stored in the customer record and/or the virtual wallet to complete the pre-authorization.

In some embodiments, a request 1260 to process a payment transaction at a fuel dispensing location is received. In some embodiments, a mobile application executing on a mobile device receives a request to log-in to the mobile application. The log-in request may include credentials associated with the user of the mobile device. The log-in request, including credentials associated with the user, may be sent to a back office server. In some embodiments, the back office server receives the log-in request and generates and/or retrieves credentials associated with the user from a database. In some embodiments, the credentials are received from the user via the mobile device. The back office server may forward the credentials to a remote server (central server) to validate the log-in request.

In some embodiments, a point of sale server may receive a product selection from a user via a point of sale user interface. In some embodiments, the point of sale server may receive the product selection from the user via the point of sale user interface prior to log-in request. In some embodiments, if the log-in was successful, the back office server may update the user interface of the mobile device to indicate the log-in was successful and display a "pay inside" option on the mobile application executing on the mobile device. The pay-inside option may alert the user to proceed inside the retail location to complete a payment transaction at a point of sale location inside the retail location.

In some embodiments, at least a portion of previously stored secure payment information may be sent 1270 to the remotely located server for authorization. The back office server may receive a pay inside selection from the user via the mobile device. The back office server may perform an API call to the remote server over HTTPS protocol for payment options. The server may transmit an identification code corresponding to the user of the mobile device and retail location information in the API call to the remote server. The remote server may receive the API call and identify payment options associated with the user. The payment options may be stored in a database on a remote server remotely located from the mobile device and/or the retail location. The remote server may generate a transaction ID for the transaction. The transaction ID may correspond to the customer ID and/or retail location of the transaction request. The transaction ID may only stay valid for the duration of the transaction. In some embodiments, the transaction ID remains valid for a predetermined time period, for example and without limitation, 15 minutes. If the transaction is not complete within the pre-determined time period, the transaction ID may be rejected based on an expired transaction ID.

In some embodiments, the remote server may generate multiple transaction ID's, each transaction ID corresponding to a different payment method associated with the user. The back office server may receive the transaction ID's and update the user interface of the mobile device to display the transaction ID's for the user to select. In some embodiments, the back office server may update the user interface of the mobile device to display a quick response (QR) code corresponding to at least one of the transaction ID's. The back office server may receive a selection from the user via the mobile application executing on the mobile device. In some embodiments, the back office server may update the user interface of the mobile device to only display the selected QR code.

In some embodiments, a scanner may read the QR code displayed on the user interface of the mobile device. In some embodiments, the mobile device may be placed in front of the scanner and the scanner reads the user interface of the mobile device to scan the QR code. The scanner may be a component of a point of sale server and/or a point of sale location in a retail location. The scanner may transmit the QR code to the point of sale server.

In some embodiments, an authorization for the requested payment transaction that does not include secure payment information is sent 1280 to the fuel dispensing location. The point of sale server may analyze the QR code to identify the user and the retail location associated with the transaction. The point of sale may identify loyalty program information, including incentives, associated with the transaction. The loyalty program information may be based at least in part on the user and/or the retail location. The point of sale server may generate a loyalty pre-authorization request, including the loyalty program information, and transmit the loyalty pre-authorization request to the server.

In some embodiments, the server may receive the loyalty pre-authorization request and transmit the loyalty pre-authorization request to the remote server. The remote server may receive the loyalty pre-authorization request. In some embodiments, the remote server may approve the loyalty pre-authorization request and generate a loyalty pre-authorization response. The remote server may transmit the loyalty pre-authorization response to the control server.

In some embodiments, the server may receive the loyalty pre-authorization response and transmit the loyalty pre-authorization response to the point of sale server. The point of sale server may receive the loyalty pre-authorization response and identify the transaction ID associated with the response. The point of sale server may transmit the loyalty pre-authorization response with the transaction ID to the server. In some embodiments, the server may receive the loyalty pre-authorization response and transmit the loyalty pre-authorization response and the transaction ID to the remote server. The remote server may receive the loyalty pre-authorization request and the transaction ID.

In some embodiments, the remote server processes the loyalty pre-authorization request. The remote server may identify secure payment information associated with the user based on the transaction ID. The remote server may apply the loyalty pre-authorization request to the transaction and calculate a purchase amount. The purchase amount may be based on the total price of the purchase and any incentives applicable to the transaction and/or the user.

In some embodiments, the fuel dispensing station at the fuel dispensing location may be activated 1290 for use by the user. In some embodiments, the remote server will transmit the loyalty pre-authorization response to the server. The loyalty pre-authorization response may include the purchase amount with incentives applied to the transaction and the transaction ID. The server may receive the loyalty pre-authorization response and transmit the loyalty pre-authorization response and the transaction ID to the point of sale server. In some embodiments, the point of sale server may receive the loyalty pre-authorization response and activate the respective point of sale location. In some embodiments, the point of sale server may receive the loyalty pre-authorization response and generate a post-authorization request. The post-authorization request may include the purchase amount and the transaction ID.

In some embodiments, the point of sale server may transmit the post-authorization request to the server. In some embodiments, the server may transmit the post-authorization request to the remote server. The point of sale server may transmit the transaction details to the server. The server may transmit the transaction details to the remote server. The transaction details may include the transaction amount, an incentive amount, a final amount of the purchase, and the transaction ID. In some embodiments, the remote server may receive the transaction details and generate a receipt for the transaction. The remote server may transmit the transaction receipt to the server. The server may receive the transaction receipt and transmit the transaction receipt to the back office server. The back office server may update the user interface of the mobile device to display the transaction receipt. In some embodiments, the point of sale server may print the transaction receipt.

Figure 13A:
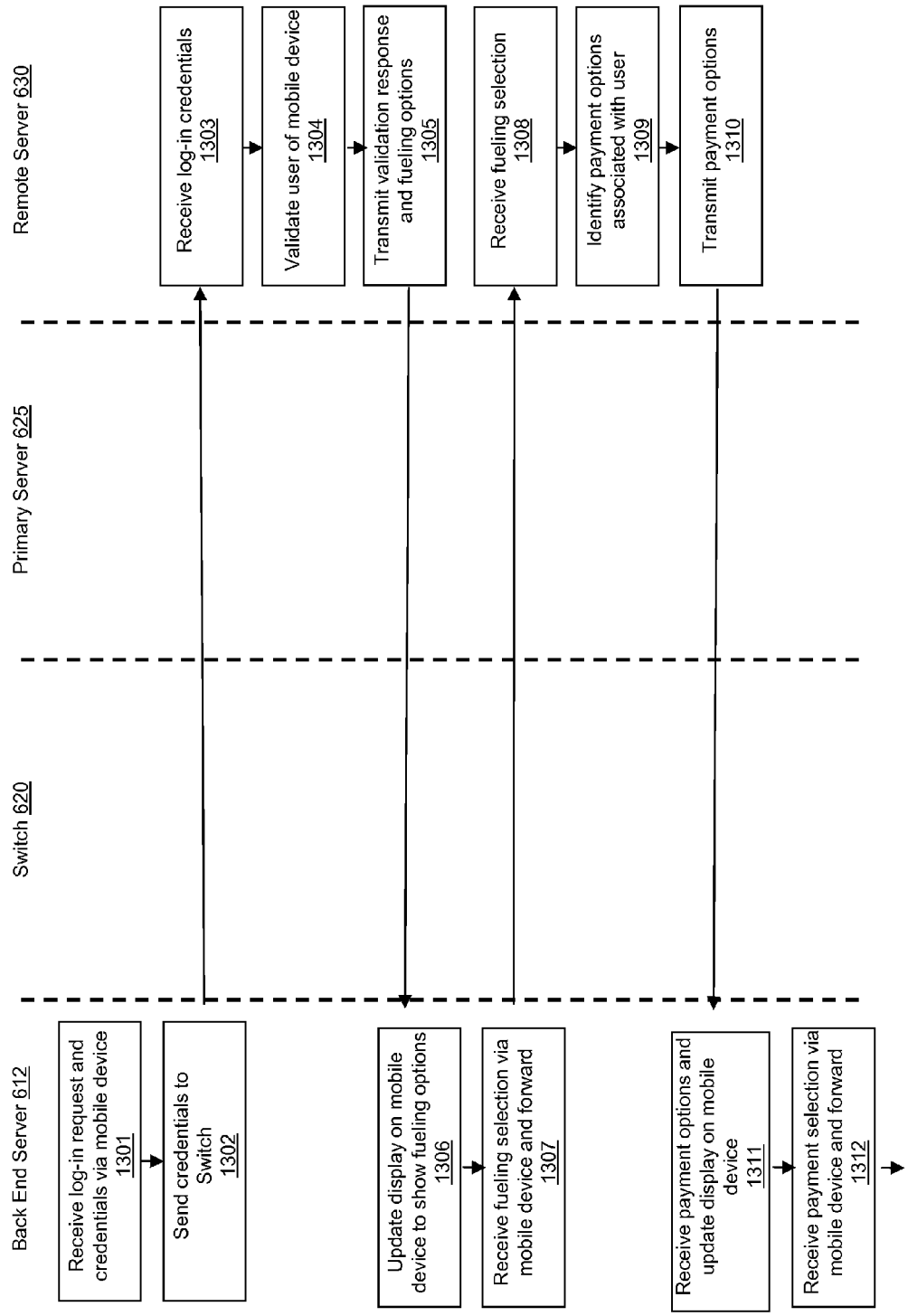
FIGS. 13A-C are flow diagrams of a method for processing electronic payments.
Figure 13B:
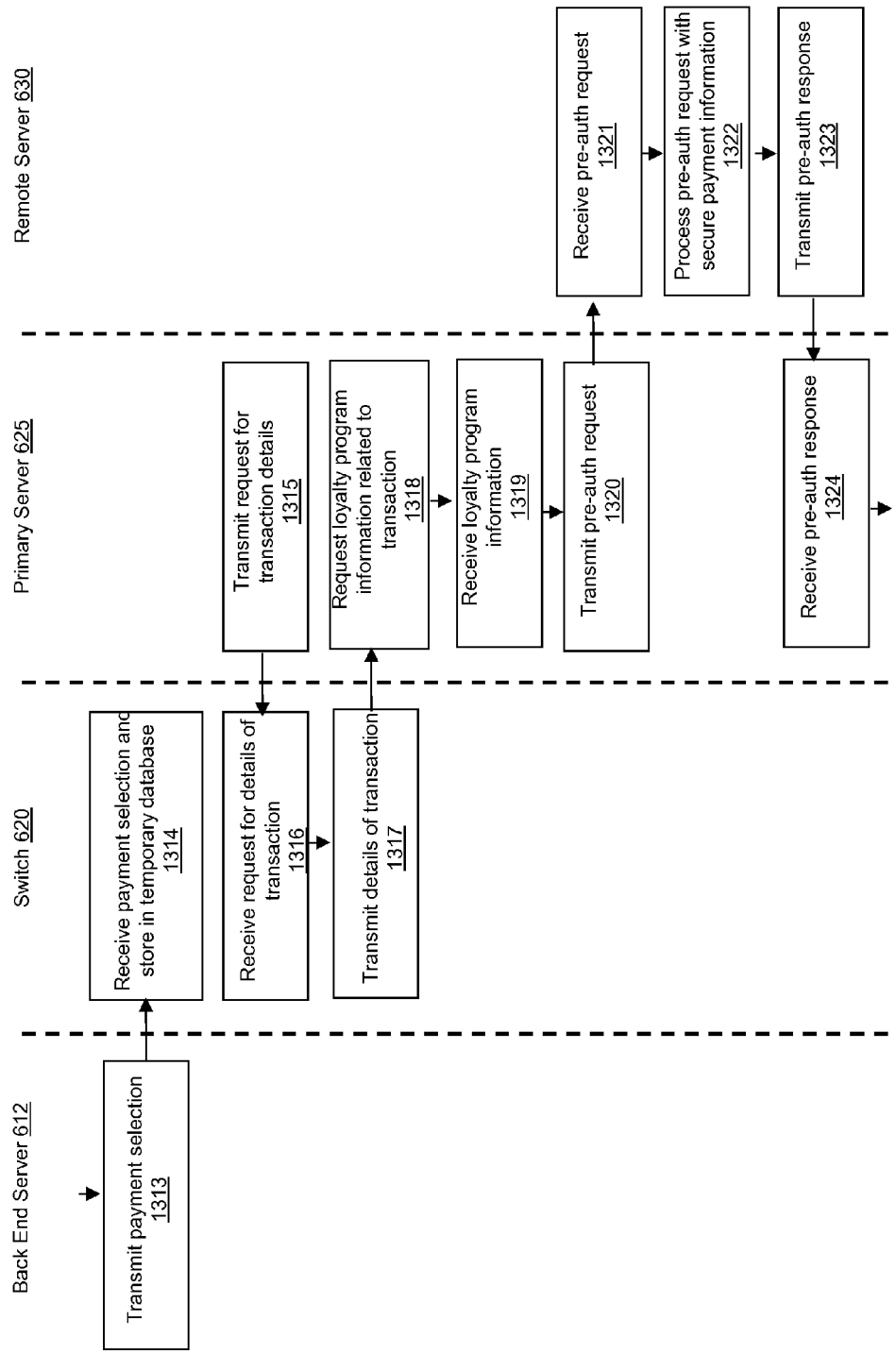
Figure 13C:
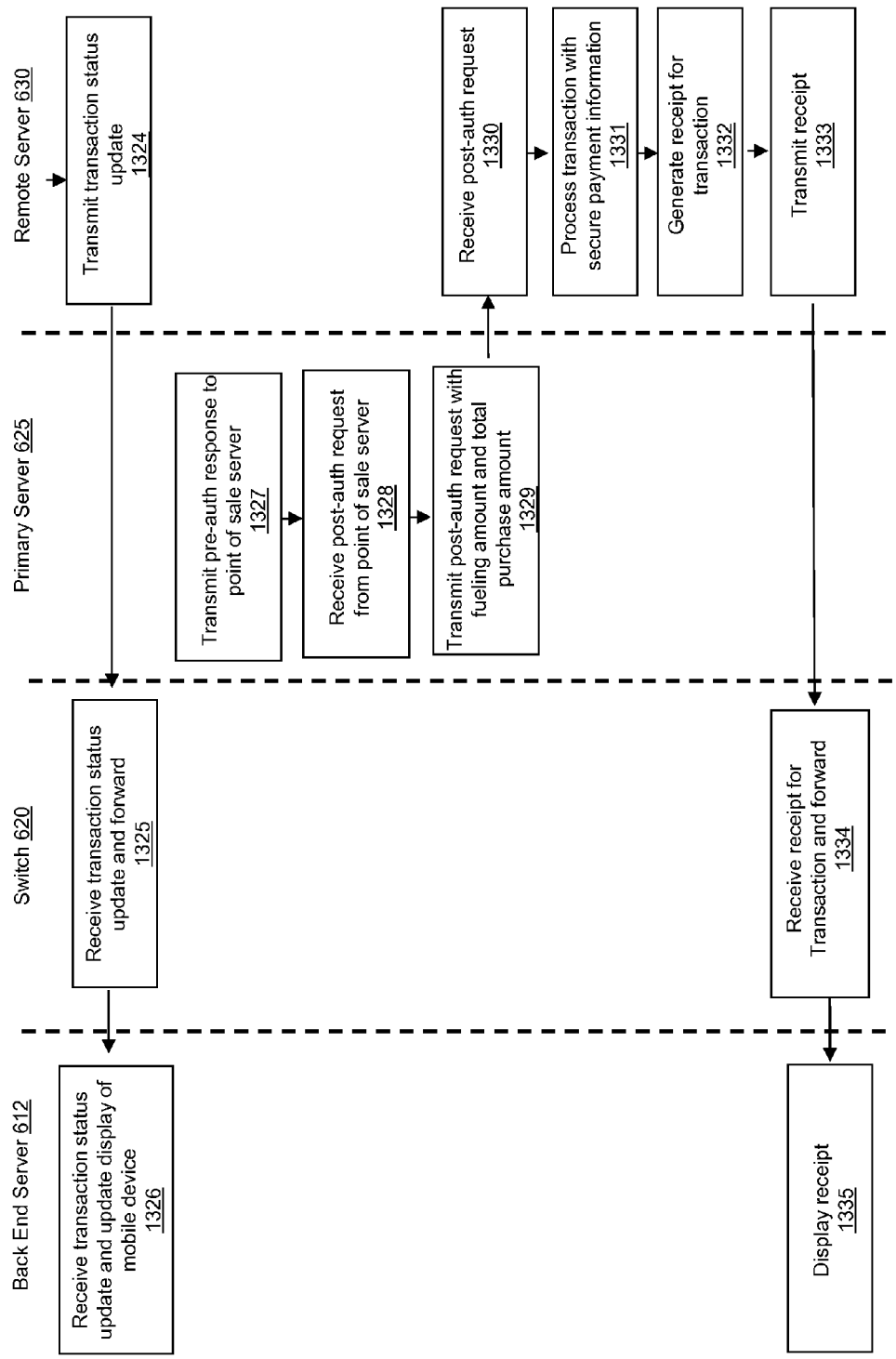

In reference now to FIGS. 13A-C, a flow diagram for processing an electronic payment at a retail location 600 is shown. A back end server 612 receives 1301 credentials from a log-in request from a user via a mobile device 605. The back end server 612 transmits 1302 the credentials to a remote server 630 to validate the user. The remote server 630 receives 1303 the credentials associated with the user of the mobile device 605. The remote server 630 validates 1304 the user of the mobile device 605 based on the credentials and accepts the log-in request. The remote server 630 transmits 1305 a validation response indicating the log-in request was successful and provides fueling options based on the location of the mobile device 605. The back end server 612 receives 1306 the validation response and fueling options and updates 1306 a user interface on the mobile device 605 to display the fueling options.

The back end server 612 receives a fueling selection from a user of the mobile device 605. The back end server 612 forwards 1307 the fueling selection to the remote server 630. The remote server 630 receives 1308 the fueling selection. The remote server 630 identifies 1309 payment options associated with the user. The remote server 630 transmits 1310 the payment options associated with the user to the back end server 612. The back end server 612 receives the payment options and updates 1311 the user interface on the mobile device 605.

The back end server 612 receives 1312 the payment selection from the user of the mobile device 605. The back end server 612 transmits 1313 to the payment selection to the switch 620. The switch 620 may be part of the back office server, for example, the switch 620 can be the switch server 620 that is a switch between the server 612, the server 625, and the remote server 630 as described above with respect to FIGS. 6A-6B. The switch 620 stores 1314 the payment selection and manages the status of the transaction in a temporary database. A primary server 625 transmits 1315 a request for details of the transaction to the switch 620. The switch 620 receives the request for the details of the transaction. The switch 620 transmits 1317 transaction details, including the payment selection and the fueling selection, to the primary server 625. The primary server 625 requests 1318 loyalty program information related to the transaction from a point of sale server 640. The primary server 625 receives 1319 loyalty program information from the point of sale server 640. The primary server 625 transmits 1320 a pre-authorization request including the loyalty program information to the remote server 630. The remote server 630 receives 1321 the pre-authorization request with the loyalty program information. The remote server 630 processes 1322 the pre-authorization request with secure payment information. The remote server 630 transmits 1323 the pre-authorization response indicating the pre-authorization is complete to the primary server 625. The remote server 630 transmits 1324 a transaction status update to the switch 620 indicating the pre-authorization is complete. The switch 620 transmits 1325 a transaction status update to the back end server 612. The back end server 612 updates 1326 the user interface of the mobile device 605 to indicate the pre-authorization is complete.

The primary server 625 transmits 1327 the completed pre-authorization request to the point of sale server 640 to activate the respective fueling location. The primary server 625 receives 1328 a post-authorization request, including the fueled amount, total purchase price, and loyalty program information, from the point of sale server when the fueling is complete. The primary server 625 transmits 1329 the post-authorization request to the remote server 630. The remote server 630 receives 1330 receives the post-authorization request. The remote server 630 processes 1331 processes the post-authorization request with secure payment information. The remote server 630 generates 1332 a receipt for the completed transaction. The remote server 630 transmits 1333 the receipt to the switch 620. The switch 620 receives the receipt for the completed transaction and transmits 1334 the receipt to the back end server 612. The back end server 612 receives the receipt and updates 1335 the user interface on the mobile device 605 to display the receipt.

What is claimed is:

1. A method for processing electronic payments, the method comprising:
   receiving, from a user, secure payment information for use in processing future payment transactions initiated by a mobile device;
   storing secure payment information for the user at a secure location remote from a fuel dispensing location;
   detecting, by an antenna, a signal from a mobile device;
   determining that the mobile device is associated with the user who previously provided payment information for use in processing payment transactions;
   receiving, from the mobile device, a request to process a payment transaction at the fuel dispensing location;
   sending at least a portion of the previously stored secure payment information to a remotely located server for authorization;
   sending to the fuel dispensing location an authorization for the requested payment transaction that does not include secure payment information; and
   activating a fuel dispensing station at the fuel dispensing location for use by the user.

2. The method of claim 1, wherein activating a fuel dispensing station for use by the user includes identifying a fueling pump among a plurality of fueling pumps and activating the identified fueling pump.

3. The method of claim 2, wherein identifying the fueling pump includes:
   determining a location of the mobile device based on the strength of the signal detected by the antenna from the mobile device; and
   identifying the fueling pump based on the determined location of the mobile device.

4. The method of claim 2, wherein activating a fuel dispensing station for use by the user includes updating a user interface of the identified fueling pump to indicate that the fueling pump is ready for serving the user.

5. The method of claim 1, wherein detecting a signal from a mobile device includes identifying a MAC address for a mobile device within a range of the fuel dispensing location.

6. The method of claim 1, further comprising:
determining, based at least in part on a customer record, that the user belongs to a loyalty program; and
applying loyalty program information to the payment transaction.

7. The method of claim 1, further comprising:
generating promotional information based on at least one of a customer record associated with the user or a current location of the mobile device; and
transmitting to the mobile device the generated promotional information.

8. The method of claim 1, wherein the promotional information includes information indicative of at least one of a coupon and a discount.

9. The method of claim 1 further comprising transmitting a receipt of the requested payment transaction to the mobile device.

10. A method for processing electronic payments, the method comprising:
receiving, from a user, secure payment information for use in processing future payment transactions initiated by a mobile device;
storing secure payment information for the user at a secure location remote from retail locations;
determining MAC addresses for a plurality of mobile devices at a retail location via one or more wireless antennas;
determining that a mobile device of the plurality of mobile devices is associated with the user who previously provided payment information for use in processing payment transactions;
receiving a request to process a payment transaction;
sending at least a portion of the previously stored secure payment information to a remotely located server for authorization; and
sending to a point of sale an authorization for the requested payment transaction that does not include secure payment information.

11. The method of claim 10, further comprising:
determining a location of the mobile device at the retail location based on one or more signals received from the mobile device by the one or more wireless antennas; and
storing the location of the mobile in a customer record.

12. The method of claim 11, further comprising:
identifying a point of sale from a plurality of points of sale based on the determined location of the mobile device, wherein sending an authorization for the requested payment transaction includes sending the authorization to the identified point of sale.

13. The method of claim 12, wherein identifying a point of sale includes:
identifying a credit card terminal based on the determined location of the mobile device; and
sending a request to the identified credit card terminal for handling the requested payment transaction.

14. The method of claim 13 further comprising:
prompting, by the identified credit card terminal, the user for payment information;
sending, by the identified credit card terminal, an authorization request including secure user payment information to the remotely located server responsive to receiving payment information from the user; and
receiving an indication of an authorization from the remotely located server.

15. The method of claim 10, further comprising:
determining, based at least in part on a customer record, that the user belongs to a loyalty program; and
applying loyalty program information to the payment transaction.

16. The method of claim 10, further comprising:
generating promotional information based on at least one of a customer record associated with the user or a current location of the user at the retail location; and
providing, to the user, promotional information via the point of sale or the mobile device.

17. The method of claim 10, wherein the promotional information includes at least one of a coupon and a discount.

18. The method of claim 10, wherein receiving a request to process a payment transaction includes receiving information relating to a payment transaction at the retail location that was not requested via the mobile device, the method further comprising:
determining a current location at the retail location of the mobile device; and
associating information relating to the payment transaction that was not requested via the mobile device with the user based at least in part on the determined location of the mobile device.

19. A system for processing electronic payments, the system comprising:
at least one antenna;
at least one processor; and
a memory storing computer code instructions thereon, the computer code instructions when executed by the at least one processor cause the system to:
receive, from a user, secure payment information for use in processing future payment transactions initiated by a mobile device;
store secure payment information for the user at a secure location remote from retail locations;
detect, via the at least one antenna, a signal from a mobile device;
determine that the mobile device is associated with the user who previously provided payment information for use in processing payment transactions;
receive, from the mobile device, a request to process a payment transaction at a fuel dispensing location;
send at least a portion of the previously stored secure payment information to a remotely located server for authorization;
send to the fuel dispensing location an authorization for the requested payment transaction that does not include secure payment information; and
activate a fuel dispensing station at the fuel dispensing location for use by the user.

20. A system for processing electronic payments, the system comprising:
at least one antenna;
at least one processor; and
a memory storing computer code instructions thereon, the computer code instructions when executed by the at least one processor cause the system to:
receive, from a user, secure payment information for use in processing future payment transactions initiated by a mobile device;
store secure payment information for the user at a secure location remote from retail locations;

determine MAC addresses for a plurality of mobile devices at a retail location via one or more wireless antennas;
determine that a mobile device of the plurality of mobile devices is associated with the user who previously provided payment information for use in processing payment transactions;
receive, from the mobile device, a request to process a payment transaction;
send at least a portion of the previously stored secure payment information to a remotely located server for authorization; and
send to a point of sale an authorization for the requested payment transaction that does not include secure payment information.

* * * * *